(12) United States Patent
Garg et al.

(10) Patent No.: US 12,718,667 B2
(45) **Date of Patent: *Aug. 25, 2026**

(54) UNAUTHORIZED ACTIVITY DETECTION AT AUTOMATED TELLER MACHINE

(71) Applicant: Bank of America Corporation, Charlotte, NC (US)

(72) Inventors: Saurabh Garg, Faridabad (IN); Abhijit Behera, Hyderabad (IN); Maneesh Kumar Sethia, Hyderabad (IN); Madala Rajasekhar, Hyderabad (IN); Ajay Gowni, Hyderabad (IN); Sivashalini Sivajothi, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,967

(22) Filed: May 22, 2024

(65) Prior Publication Data

US 2025/0363873 A1 Nov. 27, 2025

(51) Int. Cl.

*G07F 19/00* (2006.01)
*G06Q 20/34* (2012.01)
*G06Q 20/40* (2012.01)

(52) U.S. Cl.

CPC ......... *G07F 19/209* (2013.01); *G06Q 20/357* (2013.01); *G06Q 20/407* (2013.01)

(58) Field of Classification Search

CPC ... G07F 19/209; G06Q 20/357; G06Q 20/407
See application file for complete search history.

(56) References Cited

U.S. PATENT DOCUMENTS 8,322,624 B2 12/2012 Finn
9,317,164 B2 4/2016 Suwald
9,361,619 B2 6/2016 Varadarajan et al.
(Continued)

OTHER PUBLICATIONS

Feb. 13, 2025—(US) Non-Final Office Action—U.S. Appl. No. 18/670,842.

(Continued)

*Primary Examiner* — Thien M Le
*Assistant Examiner* — Asifa Habib
(74) *Attorney, Agent, or Firm* — Banner & Witcoff, Ltd.

(57) ABSTRACT

Arrangements for providing unauthorized activity detection are provided. A computing platform may receive an indication that a transaction has been initiated at a transaction processing device. The computing platform may receive, from one or more sensors arranged on the transaction processing card, capacitance data associated with a capacitance detected when the transaction processing card is inserted into the card reader. The computing platform may execute a machine learning model using, as inputs, the capacitance data, to output any detected discrepancies between the current capacitance data and expected capacitance data. If a discrepancy is detected, the computing platform may identify that a skimming device is present at the card reader of the transaction processing device. A notification indicating that the skimming device is present may be generated and transmitted to, for instance, the transaction processing card and may cause a light emitting diode on the transaction processing card to illuminate.

20 Claims, 18 Drawing Sheets

(56) References Cited

U.S. PATENT DOCUMENTS 9,564,985 B2 * 2/2017 Ray ........................ H04K 3/825
10,354,321 B2 7/2019 Royyuru et al.
10,755,533 B2 8/2020 Rodriguez Bravo
11,461,563 B1 * 10/2022 Gheorghita .......... G06K 7/0069
11,475,741 B1 * 10/2022 Johnston ............... G07F 19/207
11,815,574 B2 11/2023 Gallagher et al.
12,039,843 B2 * 7/2024 Ramadhane ........ G07F 19/2055
12,056,559 B2 8/2024 Carapelli et al.
12,148,270 B1 * 11/2024 Peng ....................... G06F 21/86
12,190,187 B1 * 1/2025 Bitter ............... G06K 19/06196
12,254,466 B1 * 3/2025 Behera ..................... G01D 5/24
2008/0308641 A1 * 12/2008 Finn ......................... H04B 5/77 235/492
2014/0067683 A1 3/2014 Varadarajan
2018/0005243 A1 1/2018 Zovi et al.
2018/0046948 A1 * 2/2018 Ray ..................... G07F 19/2055
2018/0315043 A1 11/2018 Royyuru et al.
2019/0147447 A1 * 5/2019 Mcintyre ............. G06Q 20/341 705/41
2019/0384947 A1 * 12/2019 Momose ............ G06K 13/0806
2020/0112343 A1 4/2020 Myers et al.
2020/0184230 A1 * 6/2020 Liu ........................... G06T 7/70
2020/0184444 A1 * 6/2020 Gu ....................... G07G 1/0036
2021/0110391 A1 4/2021 Mullen et al.
2021/0365906 A1 * 11/2021 Gupta ................... G06F 1/1698
2021/0374765 A1 * 12/2021 Mitchell .................. G01D 5/24
2022/0108591 A1 * 4/2022 Jayabalan ............. G07F 19/207
2022/0122071 A1 * 4/2022 Kramme ............ G06Q 30/0185
2022/0391604 A1 * 12/2022 Kageyama ............... G06K 7/08
2023/0089937 A1 * 3/2023 Singh ................... G06Q 20/405 705/64
2023/0123576 A1 * 4/2023 Gu ................... G06Q 20/38215 705/74
2023/0129964 A1 * 4/2023 Rodriguez Bravo ........................ G07F 19/207 705/43
2023/0132132 A1 * 4/2023 Ramadhane ....... G06Q 20/1085 705/43
2023/0245534 A1 * 8/2023 Jayabalan ................ G06N 3/09
2023/0252803 A1 * 8/2023 Burris .................... G06V 10/10 348/150
2023/0410114 A1 * 12/2023 Yin ........................ G06K 7/087
2024/0020492 A1 * 1/2024 Whytock ............. G06K 7/0021
2024/0029051 A1 1/2024 Sethia et al.
2024/0038029 A1 * 2/2024 Whytock ............ G07F 19/2055
2024/0280719 A1 8/2024 Denton et al.

OTHER PUBLICATIONS

Oct. 31, 2025—(US) Non-Final Office Action—U.S. Appl. No. 18/671,127.

Sep. 16, 2025—(US) Notice of Allowance—U.S. Appl. No. 18/670,842.

Mar. 10, 2026—(US) Final Office Action—U.S. Appl. No. 18/671,127.

* cited by examiner

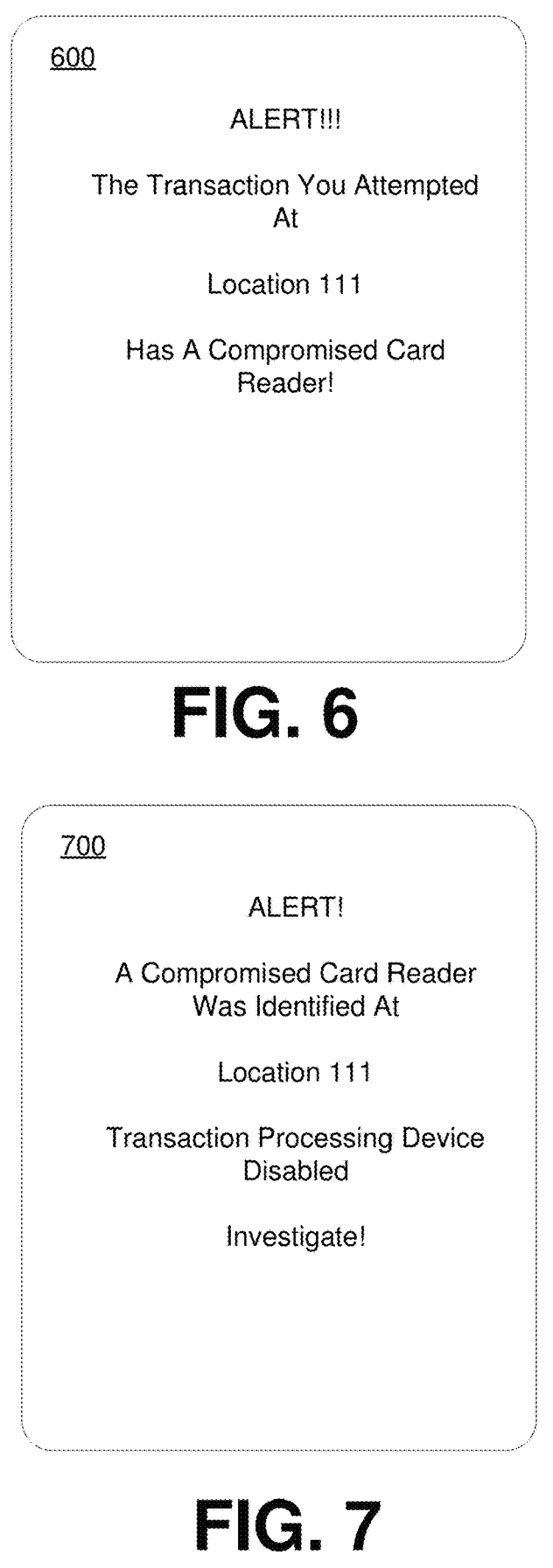

600

ALERT!!!

The Transaction You Attempted At

Location 111

Has A Compromised Card Reader!

ALERT!

A Compromised Card Reader Was Identified At

Location 111

Transaction Processing Device Disabled

Investigate!

FIG. 7

UNAUTHORIZED ACTIVITY DETECTION AT AUTOMATED TELLER MACHINE

BACKGROUND

Aspects of the disclosure relate to electrical computers, systems, and devices for detecting unauthorized activity at automated teller machines (ATMs) and other devices.

Users interact with card readers at an ATM, point-of-sale (POS) device, or the like, frequently. However, unauthorized actors have become proficient at installing devices on card readers to capture card data and use it to generate unauthorized cards to or to facilitate other unauthorized activity. In some examples, a skimming device may be used to capture data stored on a magnetic strip of a payment card. Additionally or alternatively, a shimming device may be used to capture data from a chip embedded on the payment card. Accordingly, it would be advantageous to identify a presence of an unauthorized device on a card reader and take action before a user is impacted.

Further, while skimming and/or shimming devices can be used to obtain user data without permission, other means of compromising a card or card reader exist. Accordingly, it would be advantageous to confirm the validity of a payment card and card reader in real-time, at the time of transaction, to avoid or mitigate potential impact to the user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with detecting unauthorized activity at a transaction processing device, such as an ATM, POS, or the like.

In some aspects, a computing platform may receive an indication that a transaction has been initiated at a transaction processing device. For instance, the transaction may be initiated via an interaction between a transaction processing card and a card reader of the transaction processing device. The computing platform may receive, from one or more sensors arranged on the transaction processing card, capacitance data associated with a capacitance detected when the transaction processing card is inserted into the card reader. The computing platform may execute a machine learning model using, as inputs, the capacitance data, to output any detected discrepancies between the current capacitance data and expected or baseline capacitance data.

If a discrepancy is detected, the computing platform may identify that a skimming device is present at the card reader of the transaction processing device and may generate a notification indicating that the skimming device is present. The notification may be transmitted to, for instance, the transaction processing card and may cause a light emitting diode on the transaction processing card to illuminate.

In some examples, the notification may also be transmitted to an enterprise organization computing device which may cause the enterprise organization computing device to disable, deactivate, or the like, the transaction processing device. The notification may also be transmitted to a user computing device. In some examples, the initiated transaction may be cancelled in response to the detection of the skimming device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 6 and 7 illustrate example notifications that may be generated in accordance with one or more aspects described herein;

DETAILED DESCRIPTION

Figure 1A:
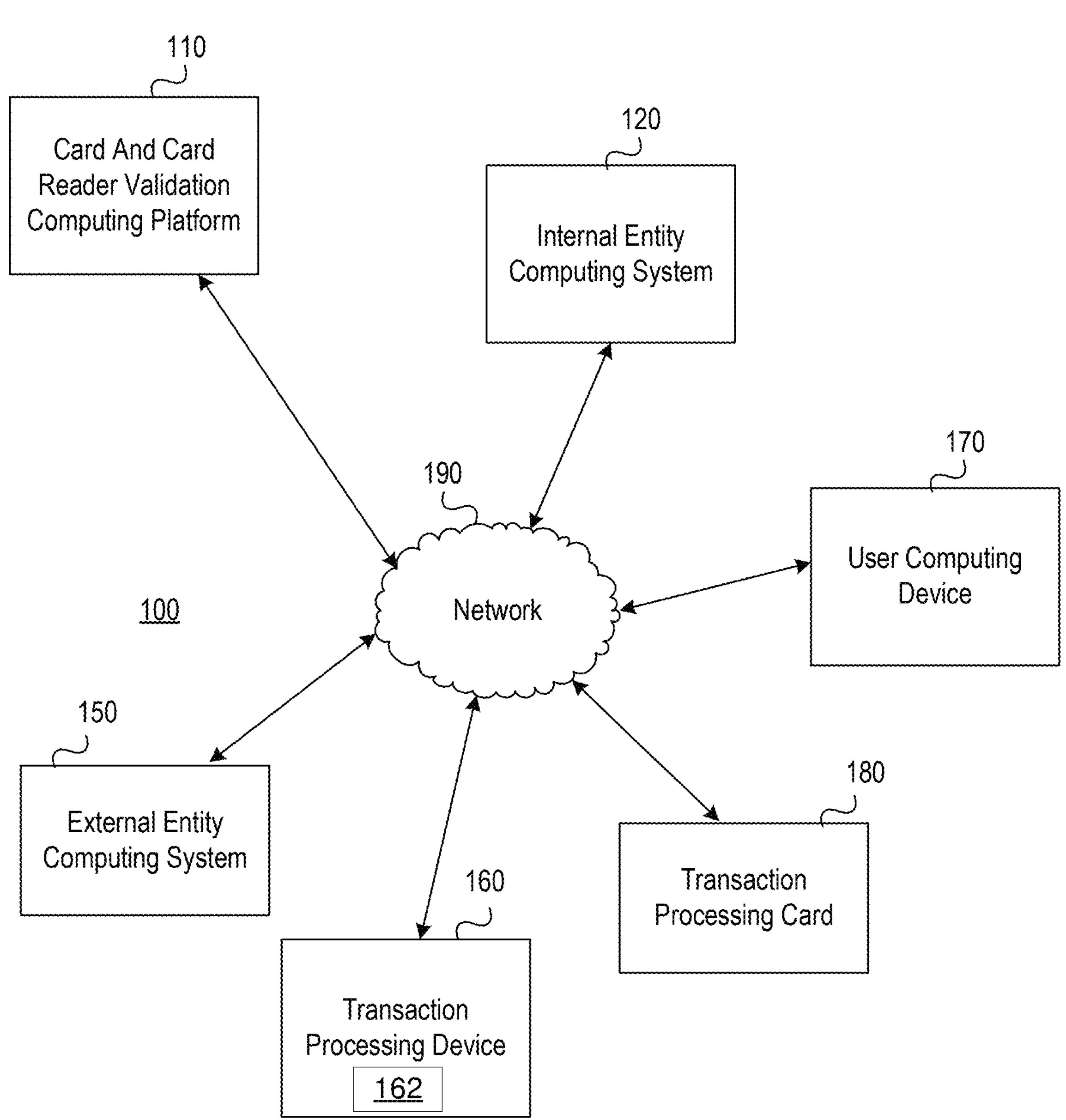
FIGS. 1A-1D depict an illustrative computing environment for implementing unauthorized activity detection in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, card readers can be compromised by unauthorized users in a variety of ways. For instance, a skimming device may be placed on top of or within a card reader slot. The card reader may appear unaltered but the skimming device may capture magnetic strip data from a user card (e.g., ATM card, debit card, credit card, or the like). When the customer inserts the card into the card reader, the skimming device may retrieve data such as account number, expiration date, card holder name, and the like, from the magnetic strip and may use that data to make unauthorized transactions, generate new cards with the unauthorized details, and the like.

In a similar arrangement, a shimming device may be placed on top of or within the card reader slot. Again, the card reader may appear unaltered but the shimming device may be used to retrieve, without authorization, card data stored on the chip (e.g., name, account number, expiration date, and the like). When the customer inserts the card into the card reader, the shimming device may retrieve the data and use it for unauthorized activity.

Accordingly, arrangements described herein provide for use of smart, integrated mini-sensors in in a transaction processing card (e.g., debit card, credit card, or the like) or card reader to detect skimming and/or shimming devices. For instance, one or more electromechanical sensors may be used to measure capacitance between a card and card reader when the card is inserted into the card reader. Because the measured capacitance is based on the physical distance between the card and card reader, a skimming device may alter the physical distance, thereby altering the measured capacitance. Machine learning may be used to evaluate the measured capacitance, detect discrepancies and execute mitigating actions.

Additionally or alternatively, magnetic sensors (e.g., a magnetometer) may be used to measure magnetic field at the transaction processing card or card reader. Because shimming devices often use metallic parts that may alter a magnetic field, presence of a shimming device may be detected using machine learning to identify discrepancies between an expected magnetic field at a card reader and a current, measured magnetic field.

Further, a card and card reader may be validated using two-way communication between the card and card reader/transaction processing device. For instance, dynamically generated codes may be generated and transferred to various devices, encrypted by one device and decrypted by another using, for instance, one or more public/private key pairs. If the encryption/decryption is successful the card and/or card reader may be validated. If not, one or more of the card or card reader may be compromised and a notification generated.

Accordingly, aspects described herein provide arrangements for detecting compromised card readers based on a presence of a skimmer or shimmer device, and using two-way communication to verify validity of a card and card reader prior to processing a transaction.

These and various other arrangements will be discussed more fully below.

FIGS. 1A-1D depict an illustrative computing environment and devices for implementing unauthorized activity detection in accordance with one or more aspects described herein. Referring to FIG. 1A, computing environment 100 may include one or more computing devices and/or other computing systems. For example, computing environment 100 may include card and card reader validation computing platform 110, internal entity computing system 120, external entity computing system 150, transaction processing device 160, user computing device 170 and/or transaction processing card 180. Although one internal entity computing system 120, one external entity computing system 150, one transaction processing device 160, one user computing device 170, and one transaction processing card 180, are shown, any number of systems or devices may be used without departing from the invention.

Card and card reader validation computing platform 110 may be configured to perform intelligent, dynamic, real-time card and card reader validation. For instance, card and card reader validation computing platform 110 may be configured to receive historical data associated with a plurality of card readers 162 at a plurality of transaction processing devices 160. For instance, data associated with card readers 162 at a plurality of automated teller machines (ATMs), point-of-sale (POS) devices, and the like may be received. This data may include capacitance data (e.g., capacitance detected by a sensor when a transaction processing card, such as a debit or credit card, is inserted into the card reader 162 slot), magnetic field data (e.g., magnetic field data captured by a sensor in the card reader 162 or on the transaction processing card 180 when the card is inserted into the card reader 162 slot), and the like. This data may be used to train a machine learning model to establish baseline capacitance and magnetic field data in order to analyze real-time capacitance and magnetic field data to detect anomalies or discrepancies that indicate a card reader is compromised by a skimming device, shimming device, or the like.

Card and card reader validation computing platform 110 may receive, in real-time or near real-time, capacitance data from sensors in a transaction processing card 180 and/or a card reader 162 having the transaction processing card 180 inserted into the card reader 162. The capacitance data may be input to the machine learning model and the model may be executed to determine whether any discrepancy exists between the current capacitance data and baseline data. If no discrepancy exists, the transaction processing device 160 may continue to process a transaction using the transaction processing card 180. If a discrepancy is detected, the card and card reader validation computing platform 110 may determine that a skimming device is present at the card reader 162 and may generate and transmit one or more notifications. For instance, a notification may be sent to a user device 170, such as a mobile device associated with a user conducting the transaction to indicate that a skimming device has been detected and to take precautionary actions (e.g., cancel card and request new card, establish fraud warnings, and the like). In some examples, a notification may be transmitted to the transaction processing card 180 which may cause one or more light emitting diodes (LEDs) to illuminate, flash, or the like, to indicate potential unauthorized activity. In some examples, the transaction processing card 180 may include an actuator that may vibrate, causing haptic feedback indicating potential unauthorized activity. In some arrangements, a notification may be transmitted to an enterprise organization associated with the transaction processing device 160 which may cause the transaction processing device 160 to be disabled or deactivated until the presence of the skimming device is investigated. Various other notifications may be generated and transmitted.

In some examples, card and card reader validation computing platform 110 may receive, in real-time or near real-time, magnetic field data from a transaction processing card 180 or card reader 162 having a transaction processing card 180 inserted into the card reader 162. The magnetic field data may be input to the machine learning model and the model may be executed to determine whether any discrepancy exists between the current magnetic field data and baseline data. If no discrepancy exists, the transaction processing device 160 may continue to process a transaction using the transaction processing card 180. If a discrepancy is detected, the card and card reader validation computing platform 110 may determine that a shimming device is present at the card reader and may generate and transmit one or more notifications. For instance, a notification may be sent to a user device 170, such as a mobile device associated with a user conducting the transaction to indicate that a shimming device has been detected and to take precautionary actions (e.g., cancel card and request new card, establish fraud warnings, and the like). In some examples, a notification may be transmitted to the transaction processing card 180 which may cause one or more light emitting diodes (LEDs) to illuminate, flash, or the like, to indicate potential unauthorized activity. In some examples, the transaction processing card 180 may include an actuator that may vibrate, causing haptic feedback indicating potential unauthorized activity. In some arrangements, a notification may be transmitted to an enterprise organization associated with the transaction processing device 160 which may cause the transaction processing device 160 to be disabled or deactivated until the presence of the shimming device is investigated. Various other notifications may be generated and transmitted.

In some arrangements, card and card reader validation computing platform 110 may rely on two-way communication (e.g., via near-field communication) to validate a card and card reader. For instance, card and card reader validation computing platform 110 may receive a request for a transaction. The request may be received from a card reader 162 at a transaction processing device 160, such as an ATM, POS, or the like. Card and card reader validation computing platform 110 may dynamically generate a validation code. In some examples, the validation code may include a time stamp associated with the transaction, a unique identifier associated with the card reader 162, and geo-location data associated with the transaction processing device 160. The validation code may be transmitted to the transaction processing card 180 inserted into the card reader slot. In response, the transaction processing card 180 may encrypt the validation code using an encryption key associated with the transaction processing card 180.

The encrypted code may be transmitted to the card and card reader validation computing platform 110 and the card and card reader validation computing platform 110 may attempt to decrypt the encrypted code using a key associated with the card reader 162. If the decryption is not successful, the request for transaction may be denied and a notification indicating that the card is not valid may be generated and transmitted to one or more devices, such as user computing device 170, an enterprise organization computing device, such as internal entity computing system 120, or the like.

If the decryption is successful, in some examples, the transaction may be processed or may proceed. In some arrangements, prior to processing the transaction, a verification code associated with the card reader 162 may be dynamically generated and encrypted using an encryption key associated with the card reader 162. The encrypted verification code may be transmitted to the transaction processing card 180 and the transaction processing card 180 may decrypt the encrypted verification code using a key associated with the transaction processing card 180. The decrypted verification code may be transmitted to the card and card reader validation computing platform 110 and compared to the generated verification code. If the decrypted code matches the verification code, the card reader 162 may be validated and the transaction may be processed. If the decrypted code does not match the generated code, a notification indicating that the card reader 162 is compromised may be generated and transmitted to one or more devices, such as a user device 170, an enterprise organization computing device, such as internal entity computing system 120, external entity computing system 150, or the like.

In some examples, card and card reader validation computing platform 110 may be part of a transaction processing device 160, transaction processing card 180, or the like. For instance, one or more processes or functions described as performed by the card and card reader validation computing platform 110 may be performed by or at the transaction processing device 160, transaction processing card 180, or the like. In other examples, card and card reader validation computing platform 110 may be a device separate from transaction processing device 160 but in communication with or connected to transaction processing device 160.

Computing environment 100 may further include internal entity computing system 120 that may be or include one or more computing systems, devices, or the like, that may host or execute one or more applications of an enterprise organization. For instance, internal entity computing system 120 may host or execute one or more applications in use by an enterprise organization (e.g., to process transactions, open new accounts, and the like). In some examples, internal entity computing system 120 may store user data, account data, and the like. Internal entity computing system 120 may also be configured to receive and display one or more notifications (e.g., related to detection of a skimming or shimming device, an invalid card or compromised card reader, or the like), and/or may facilitate shut down of a compromised transaction processing device 160.

External entity computing system 150 may be or include one or more external transaction processing systems. In some arrangements, external entity computing system 150 may include an external entity transaction processing system or service. For instance, external entity computing system 150 may be associated with one or more financial institutions other than the enterprise organization, one or more credit card providers, or the like. Accordingly, upon authorizing a transaction (such as a debit or credit card transaction), in some examples, instructions to process a transaction may be sent or transmitted to external entity computing system 150 for processing.

Computing environment 100 may further include a transaction processing device 160. In some examples, a transaction processing device 160 may include an automated teller machine (ATM), self-service kiosk, point-of-sale system at a retail location, or the like. The transaction processing device 160 may be configured to process debit and credit transactions, process ATM transactions, or the like. The transaction processing device 160 may include one or more card readers 162 having card reader slots (e.g., a card reader 162 for a user to swipe a card through or insert a card into a slot to capture data from a magnetic strip, a card reader 162 for inserting a chip-enabled card to capture data from the chip, or the like). In some examples, one or more sensors may be integrated into the card reader 162 to capture or measure capacitance, magnetic field, and the like.

User computing device 170 may include a computing device (e.g., laptop, desktop, mobile device, wearable device, or the like) and may be configured to receive and display notifications from the card and card reader validation computing platform 110.

Transaction processing card 180 may be a standard "credit card" style device having a generally planar surface. In some examples, the transaction processing card 180 may include a magnetic strip storing data such as account data, card holder data, expiration date of the card, and the like. In some arrangements the transaction processing card 180 may include a chip storing similar data. The transaction processing card 180 may further include a microprocessor and/or micro-antenna 183 for communicating with one or more card readers, card and card reader validation computing platform 110 and the like to encrypt a validation code, decrypt a verification code, and the like. In some examples, transaction processing card 180 may include one or more sensors 181 embedded on the transaction processing card 180. The one or more sensors 181 may be used to capture or measure capacitance, magnetic field, and the like, and may transmit the data to card and card reader validation computing platform 110 for analysis.

In some examples, the transaction processing card 180 may include a plurality of selectable options, each option associated with a different mode of processing (e.g., debit, credit). In some examples, the selectable options may include physical buttons arranged on a surface or face of the generally planar surface of the transaction processing card 180. In some examples, a visual indicator identifying a selected mode of processing may be associated with each selectable option.

Figure 1B:
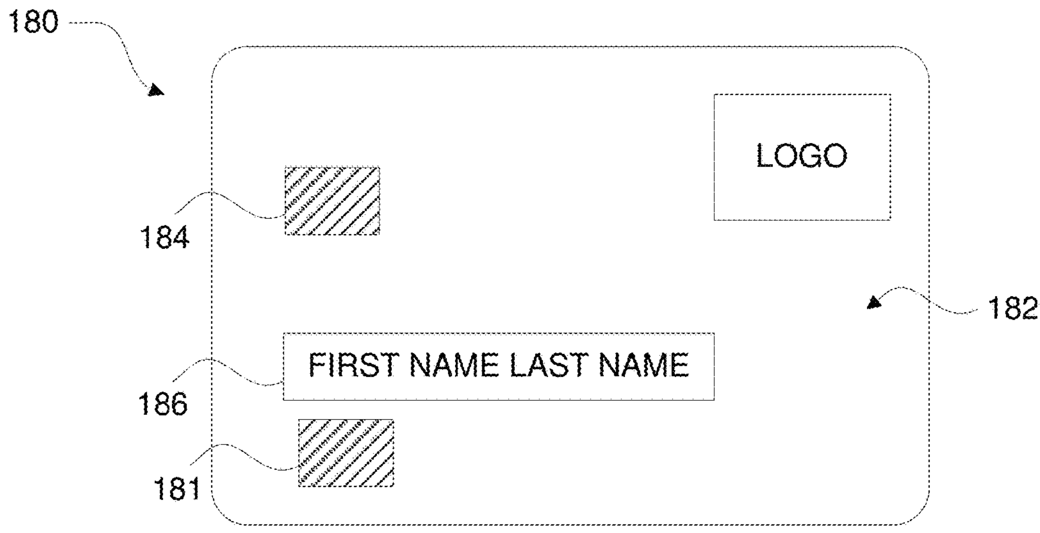
Figure 1C:
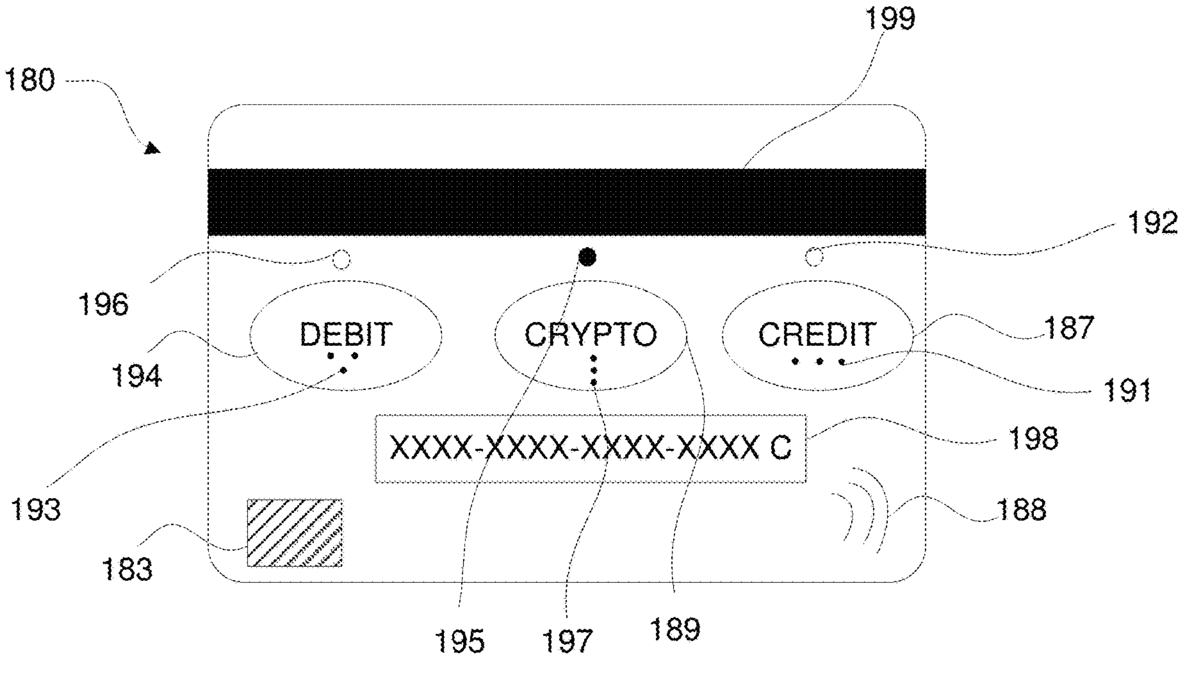

For instance, FIGS. 1B and 1C illustrate front and back views, respectively, of one example transaction processing card 180 that may be used in accordance with one or more aspects described herein. For instance, FIG. 1B illustrates a front view of transaction processing card 180, while FIG. 1C illustrates an opposite or rear view of the transaction processing card 180.

In some examples, the transaction processing card 180 may include a generally planar region 182 including payment processing components, such as a user name region 186, smart chip 184, near field communication 188, magnetic data strip 199, microprocessor and micro antenna 183, one or more sensors 181, and the like. In some examples, the transaction processing card 180 may include selectable buttons or options 187, 189, 194, for a user to select a type of functionality (e.g., crypto 189, debit 194 or credit 187). For instance, the transaction processing card 180 may include a selectable option or physical button 194 for the user to select when debit functionality is desired, a selectable option or button 187 for the user to select when credit functionality is desired and a selectable option or button 189 for the user to select when crypto functionality is desired. In some examples, the transaction processing card 180 may include at least three selectable options and pressing the option may toggle the selected option on or off. In some arrangements, the selectable options on transaction processing card 180 may include a haptic region 191, 193, 197 that may enable selection of an option for visually impaired users (e.g., debit option raised indicators 193, credit option raised indicators 191, and crypto option raised indicators 197). In some examples, each selectable option may be associated with a visual indicator 192, 195, 196 that may illuminate when the option is selected. For instance, as shown in FIG. 1C, visual indicator 195 is filled indicating that the indicator 195 is illuminated to note that a crypto option is selected. In some examples, each visual indicator may illuminate in a different color (e.g., green for safe, red for compromised, or the like) to provide simplified differentiation to a user of the selected mode of functionality or processing. In some examples, the visual indicators 192, 195, 196 may be configured to illuminate, illuminate in a particular color, flash at one or more frequencies, or the like, to indicate that the transaction processing card 180 and/or transaction processing device 160 is compromised.

Sensors 181 may be used to measure or capture capacitance, magnetic field, pressure (e.g., applied upon insertion of the transaction processing card 180 into the card reader 162), position of the card reader 162 relative to the transaction processing card 180, thickness of the card reader 162, and the like. This data may be analyzed, using machine learning, to identify discrepancies that may indicate presence of a skimming device, shimming device, or the like.

Further, in some examples, the transaction processing card 180 may include a display screen or region 198. The display screen 198 may be used to provide a visual indication of a dynamically generated device identifier (e.g., XXXX-XXXX-XXXX-XXXX C). In some examples, the "C" may be a flag indicating that crypto has been selected. In some examples, the display screen 198 may also be used to provide a visual indication of whether a requested transaction was successfully processed, may indicate a presence of a skimmer or shimmer (e.g., a compromised card reader), and/or may provide additional notifications to the user (e.g., low balance on account, or the like).

In some examples, transaction processing card 180 may include an actuator or other device that may cause the transaction processing card to vibrate to indicate a potential compromise situation. For instance, if a skimmer or shimmer is detected, if a card or card reader fails a validation protocol, or the like, the transaction processing card 180 may vibrate to indicate a potential issue.

As mentioned above, computing environment 100 also may include one or more networks, which may interconnect one or more of card and card reader validation computing platform 110, internal entity computing system 120, external entity computing system 150, transaction processing device 160, user computing device 170, and/or transaction processing card 180. For example, computing environment 100 may include network 190, which may be a public or private network. Network 190 may include one or more subnetworks (e.g., Local Area Networks (LANs), Wide Area Networks (WANs), or the like). Network 190 may interconnect one or more computing devices associated with the organization. For example, card and card reader validation computing platform 110, internal entity computing system 120, external entity computing system 150, transaction processing device 160, user computing device 170, and/or transaction processing card 180 may be connected via network 190 to interconnect card and card reader validation computing platform 110, internal entity computing system 120, external entity computing system 150, transaction processing device 160, user computing device 170, and/or transaction processing card 180.

Figure 1D:
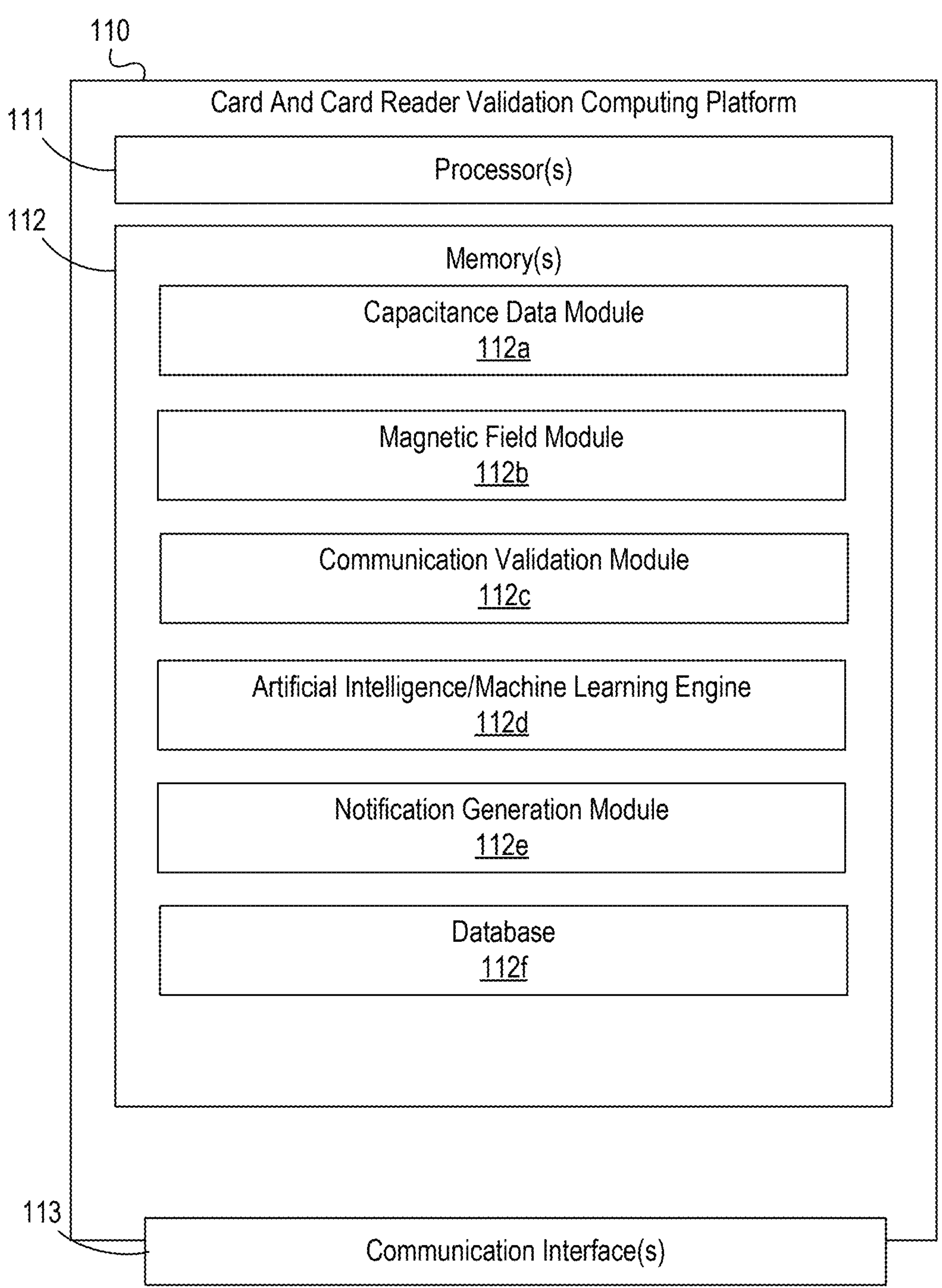

Referring to FIG. 1D, card and card reader validation computing platform 110 may include one or more processors 111, memory 112, and communication interface 113. A data bus may interconnect processor(s) 111, memory 112, and communication interface 113. Communication interface 113 may be a network interface configured to support communication between card and card reader validation computing platform 110 and one or more networks (e.g., private network 190, or the like). Memory 112 may include one or more program modules having instructions that when executed by processor(s) 111 cause card and card reader validation computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of card and card reader validation computing platform 110 and/or by different computing devices that may form and/or otherwise make up card and card reader validation computing platform 110.

For example, memory 112 may have, store and/or include capacitance module 112*a*. Capacitance module 112*a* may store instructions and/or data that may cause or enable the card and card reader validation computing platform 110 to receive capacitance data from sensors arranged in transaction processing cards 180 and/or card readers 162 at a variety of transaction processing devices 160, such as ATMs, POSs, and the like. The capacitance data may be measured when a transaction processing card 180 is inserted into or swiped through a card reader 162 at the transaction processing device 160 (e.g., to capture magnetic strip data to process a transaction). In addition, capacitance module 112*a* may be configured to receive real-time capacitance data from transaction processing cards 180 and/or card readers 162 at one or more transaction processing devices 160 to evaluate the data using artificial intelligence/machine learning to detect any discrepancies that may indicate presence of a skimmer device or other compromise of the card reader 162.

Card and card reader validation computing platform 110 may further have, store and/or include magnetic field module 112*b*. Magnetic field module 112*b* may store instructions and/or data that may cause or enable the card and card reader validation computing platform 110 to receive magnetic field data from sensors arranged in a transaction processing card 180 and/or card reader 162 at the variety of transaction processing devices 160, such as ATMs, POSs, and the like. The magnetic field data may be captured when a transaction processing card 180 is inserted into a card reader 162 at the transaction processing device 160 (e.g., to extract chip data for processing a transaction). In addition, magnetic field module 112*b* may be configured to receive real-time magnetic field data from transaction processing cards 180 and/or card readers 162 at one or more transaction processing devices 160 to evaluate the data using artificial intelligence/machine learning to detect any discrepancies that may indicate a presence of a shimmer device or other compromise of the card reader.

Card and card reader validation computing platform 110 may further have, store and/or include communication validation module 112*c*. Communication validation module 112*c* may store instructions and/or data that may cause or enable the card and card reader validation computing platform 110 to generate, in real-time, a validation code that may be transmitted to a transaction processing card 180 in a card reader 162 slot (e.g., via two-way communication between the transaction processing card 180 and the card reader 162/transaction processing device 160/card and card reader validation computing platform 110). In some examples, near-field communication may be used to enable communication between the transaction processing card 180, card reader 162/transaction processing device 160 and/or card and card reader validation computing platform 110. The validation code may be dynamically generated and may include a time stamp of the transaction, a unique identifier associated with the card reader 162 and/or transaction processing device 160 and geo-location data associated with the transaction processing device 160. Communication validation module 112*c* may transmit the validation code to the transaction processing card 180 where it may be encrypted (e.g., via microprocessor 183) with a key associated with the transaction processing card 180. The encrypted code may be transmitted by the transaction processing card 180 to the card and card reader validation computing platform 110 (e.g., via card reader 162/transaction processing device 160) and may be decrypted using a key associated with the transaction processing device 160/card reader 162. If the decryption is successful, the card 180 may be deemed valid and the transaction may continue.

In some examples, before continuing the transaction, the card reader 162 may be validated. For instance, a verification code may be generated by the communication validation module 112*c* and encrypted using a key associated with the card reader 162 of transaction processing device 160. The encrypted code may be transmitted to the transaction processing card 180 where it may be decrypted using a decryption key associated with the transaction processing card 180. The decrypted verification code may be sent back to the communication validation module 112*c* of the card and card reader validation computing platform 110 and compared to the generated code. If the codes match, the card reader 162 of the transaction processing device 160 may be considered valid and the transaction may proceed. If the codes do not match, the card reader may be considered compromised.

Card and card reader validation computing platform 110 may further have, store and/or include artificial intelligence/machine learning (AI/ML) engine 112*d*. AI/ML engine 112*d* may store instructions and/or data that may cause or enable the card and card reader validation computing platform 110 to train, execute, update and/or validate one or more artificial intelligence/machine learning models to receive, as inputs, capacitance data or magnetic field data and generate or output a detected discrepancy.

The machine learning model may be trained using previously captured and/or historical capacitance data, magnetic field data, and the like, captured from a plurality of cards 180 and/or card readers at various transaction processing devices 160 (e.g., ATMs, POSs, and the like). For instance, data associated with capacitance measurements from transactions performed at various transaction processing devices 160 may be used to establish a baseline or expected capacitance that may be used to identify discrepancies that may indicate presence of a skimmer device or other compromise of the card reader 162 based on one or more patterns, sequences or correlations in the data. For instance, the presence of a skimmer may modify the distance between a surface of a card reader 162 and the transaction processing card 180, which may impact the measured capacitance at the card 180 or card reader 162. Additionally or alternatively, data associated with magnetic fields generated at various transaction processing cards 180 and/or transaction processing devices 160 may be used to establish baseline or expected magnetic field data that may be used to identify discrepancies that may indicate a presence of a shimmer device or other compromise of the card reader 162 based on one or more patterns, sequences or correlations in the data. For instance, shimming devices often include metal components that may modify the magnetic field generated at the card reader 162.

In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models. In some examples, training the machine learning model may include training the model using labeled data (e.g., labeled data including capacitance data at previously identified compromised and uncompromised card readers, magnetic field data at previously identified compromised and uncompromised card readers, and the like) and/or unlabeled data.

Accordingly, AI/ML engine 112*d* may receive, as inputs to the machine learning model, current or real-time capacitance data and/or magnetic field data and may identify any discrepancies.

Card and card reader validation computing platform 110 may further have, store and/or include notification generation module 112*e*. Notification generation module 112*e* may store instructions and/or data that may cause or enable the card and card reader validation computing platform 110 to generate one or more notifications of potential compromise of a transaction processing device 160 (e.g., card reader 162), of a transaction processing card 180, or the like. In some examples, the notification may be transmitted to the transaction processing card 180 and may include an instruction or command causing one or more LEDs on the transaction processing card 180 to illuminate, flash, change color, or the like. Additionally or alternative, the notification may include an instruction or command causing an actuator to vibrate the transaction processing card 180 to indicate potential compromise of the card reader or card. In some examples, notifications may be generated and transmitted to a user computing device 170, an enterprise organization computing device such as internal entity computing system 120, external entity computing system 150, or the like, and displayed by a display of the device.

Card and card reader validation computing platform 110 may further have, store and/or include a database **112*f*. Database 112*f* may store historical data related to capacitance data, magnetic field data, identified compromised cards or card readers, and/or other data to perform the functions of the card and card reader validation computing platform 110** described herein.

FIGS. 2A-2I depict one example illustrative event sequence for unauthorized activity detection in accordance with one or more aspects described herein. The events shown in the illustrative event sequence are merely one example sequence and additional events may be added, or events may be omitted, without departing from the invention. Further, one or more processes discussed with respect to FIGS. 2A-2I may be performed in real-time or near real-time.

Figure 2A:
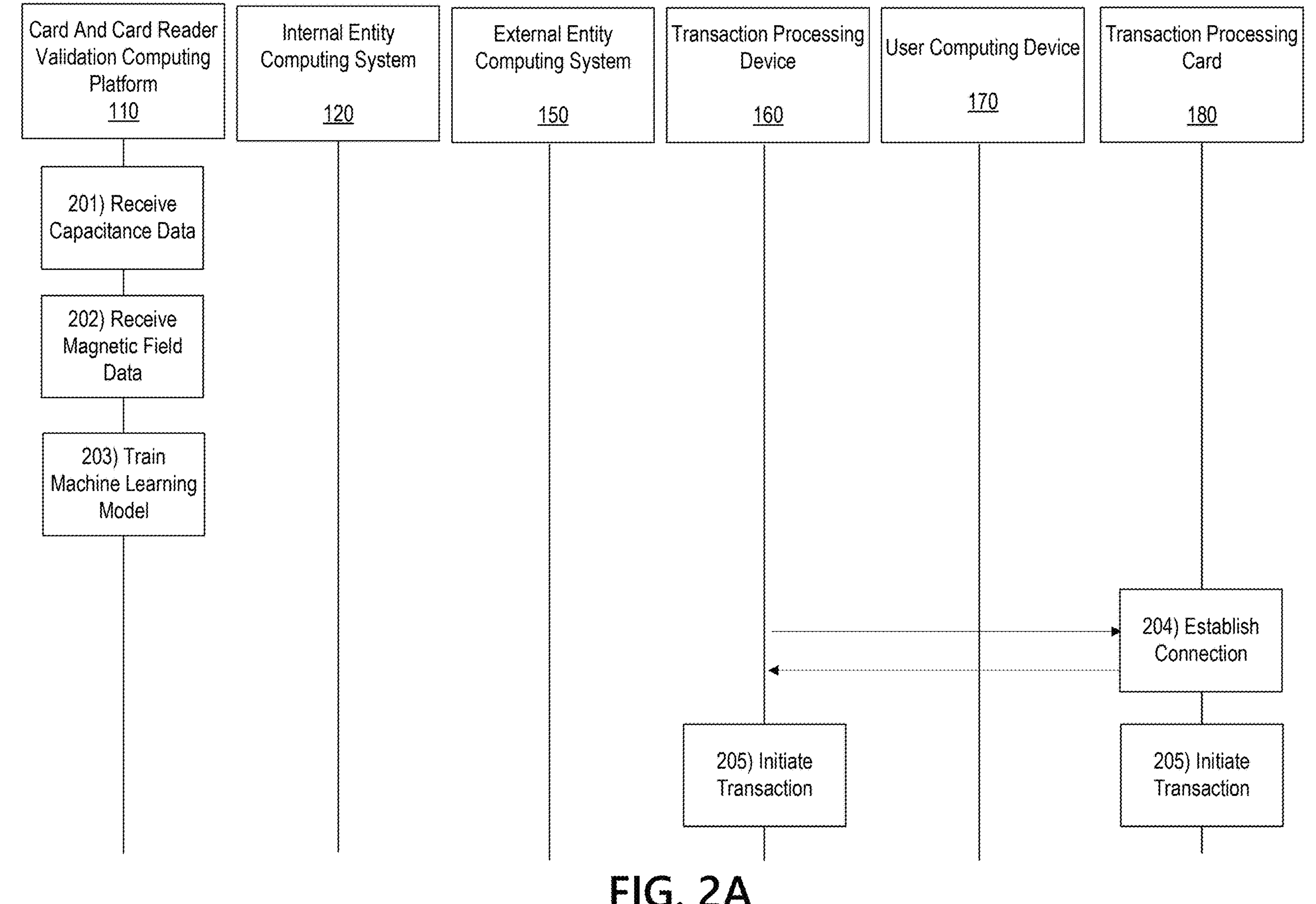
FIGS. 2A-2I depict an illustrative event sequence for implementing unauthorized activity detection in accordance with one or more aspects described herein.

In some aspects, a transaction processing device 160 and associated card reader 162 may be evaluated to determine whether it is compromised based on a presence of a skimming device. With reference to FIG. 2A, at step 201, card and card reader validation computing platform 110 may receive capacitance data. For instance, capacitance data associated with capacitance measured by a sensor in a transaction processing card 180 (e.g., upon insertion into or swipe through a card reader 162), card reader 162 at a plurality of transaction processing devices 160 (e.g., ATMs, POSs, and the like), or the like may be received. The capacitance data may be captured or measured while the transaction processing card 180 is in a card reader 162 associated with a respective transaction processing device 160. The data received may be from a plurality of transactions performed with a plurality of transaction processing cards 180 at a plurality of transaction processing devices 160 in a network, associated with an enterprise organization, or the like.

At step 202, card and card reader validation computing platform 110 may receive magnetic field data. For instance, magnetic field data captured by sensors in a transaction processing card 180 (e.g., when the transaction processing card is inserted into the card reader 162), card reader 162 at a plurality of transaction processing devices 160 (e.g., ATMs, POSs, and the like), or the like may be received. The magnetic field data may be captured while a transaction processing card 180 is in a card reader 162 associated with a respective transaction processing device 160. The data received may be from a plurality of transactions performed with a plurality of transaction processing cards 180 at a plurality of transaction processing devices 160 in a network, associated with an enterprise organization, or the like.

At step 203, card and card reader validation computing platform 110 may train a machine learning model. For instance, the capacitance data received at step 201, and the magnetic field data received at step 202, may be used to train a machine learning model to identify patterns, sequences or correlations in data to determine a baseline or expected capacitance and magnetic field. In some examples, baseline or expected data may be determined for each transaction processing device 160 (e.g., each card reader 162 at each transaction processing device 160 to accommodate for differences in physical characteristics of each card reader 162 that may impact capacitance or magnetic field).

At step 204, transaction processing card 180 may connect to transaction processing device 160. For instance, a first wireless connection may be established between transaction processing card 180 and transaction processing device 160. In some examples, the first wireless connection may be a near-field communication connection. Upon establishing the first wireless connection, a communication session may be initiated between transaction processing card 180 and transaction processing device 160. In some examples, the connection may be established upon a user inserting or swiping the transaction processing card 180 through a card reader 162 of the transaction processing device 160.

At step 205, responsive to establishing the first wireless connection, a transaction may be initiated between transaction processing card 180 and transaction processing device 160. For instance, if the transaction processing device 160 is an ATM, a user may insert a card 180 to initiate the connection and then initiate the transaction by authenticating to the device, making a selection of a transaction type, or the like. In examples in which the transaction processing device 160 is a POS device, the user may insert the transaction processing card 180 into a card reader 162 or swipe the card through a card reader 162 to initiate communication and initiate processing of a transaction (e.g., purchase of an item, or the like).

Figure 2B:
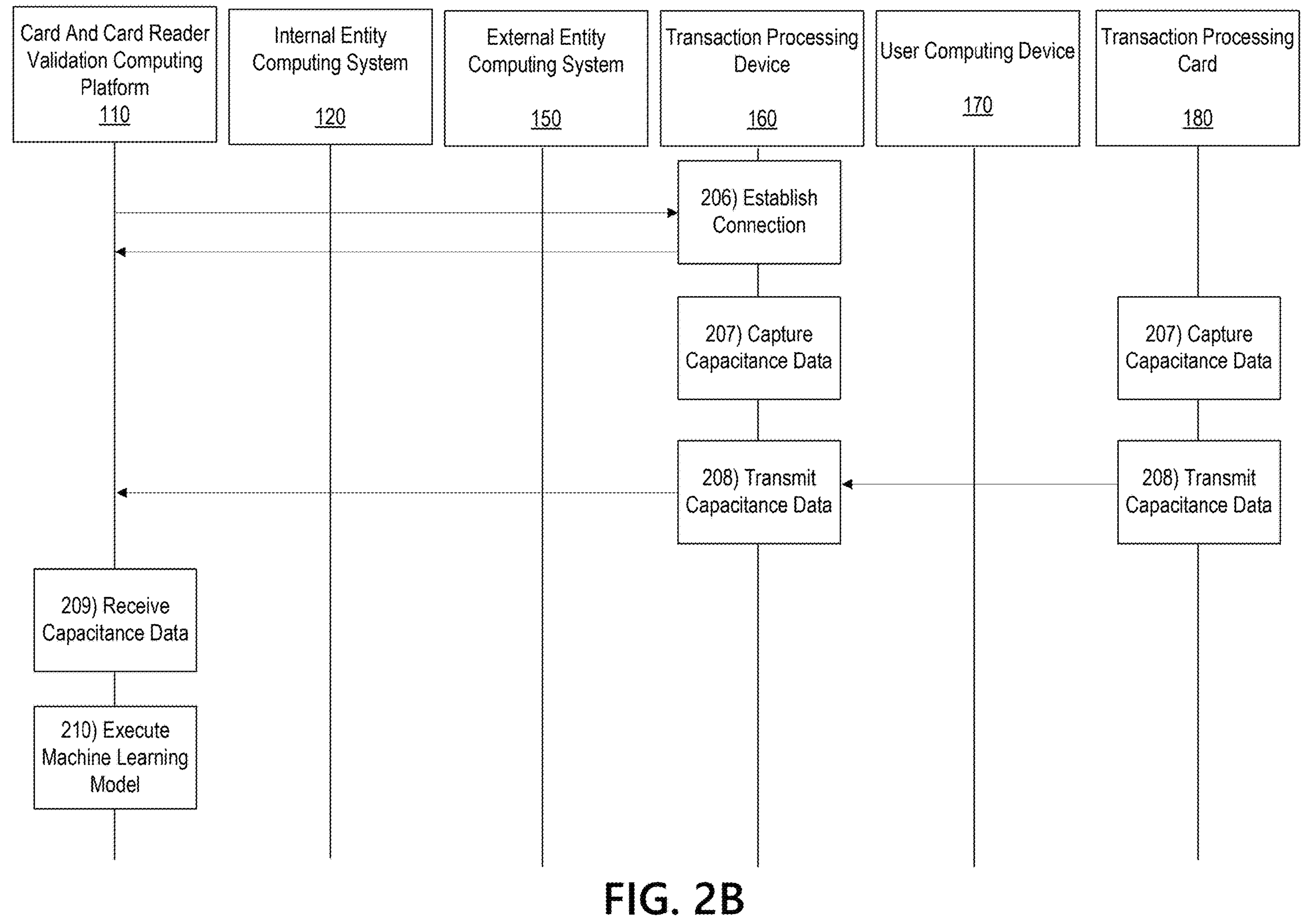

With reference to FIG. 2B, at step 206, transaction processing device 160 may connect to card and card reader validation computing platform 110. For instance, a second wireless connection may be established between transaction processing device 160 and card and card reader validation computing platform. Upon establishing the second wireless connection, a communication session may be initiated between transaction processing device 160 and card and card reader validation computing platform 110.

At step 207, transaction processing device 160 may capture capacitance data for the current initiated transaction (e.g., the transaction initiated at step 205). For instance, one or more sensors arranged in the transaction processing card 180 and/or card reader 162 may be used to capture capacitance data generated when the transaction processing card 180 is inserted into the card reader 162 slot or swiped through the slot. If a skimming device is present, that may alter the capacitance measured because it alters the physical distance between the card reader 162 and the card 180.

At step 208, the measured or captured capacitance data may be transmitted by the transaction processing device 160 to the card and card reader validation computing platform 110. For instance, the capacitance data may be transmitted during the communication session initiated upon establishing the second wireless connection. The capacitance data may be captured and transmitted in real-time.

In some examples, the capacitance data may be captured or measured by sensors on the transaction processing card 180 and the transaction processing card 180 may transmit or send the measured or captured data to the transaction processing device 160 for transmission to the card and card reader validation computing platform 110, or may send the data directly to the card and card reader validation computing platform 110.

At step 209, the card and card reader validation computing platform 110 may receive the capacitance data.

At step 210, the card and card reader validation computing platform 110 may execute the machine learning model. For instance, the received current capacitance data may be input to the machine learning model and the model may be executed to output any discrepancies between the current capacitance data and expected or baseline data. In some examples, the baseline or expected data may be particular to the transaction processing device 160 and associated card reader 162. In some examples, the generated expected or baseline data may be particular to a combination of a transaction processing card 180 and card reader 162 of the transaction processing device 160.

Figure 2C:
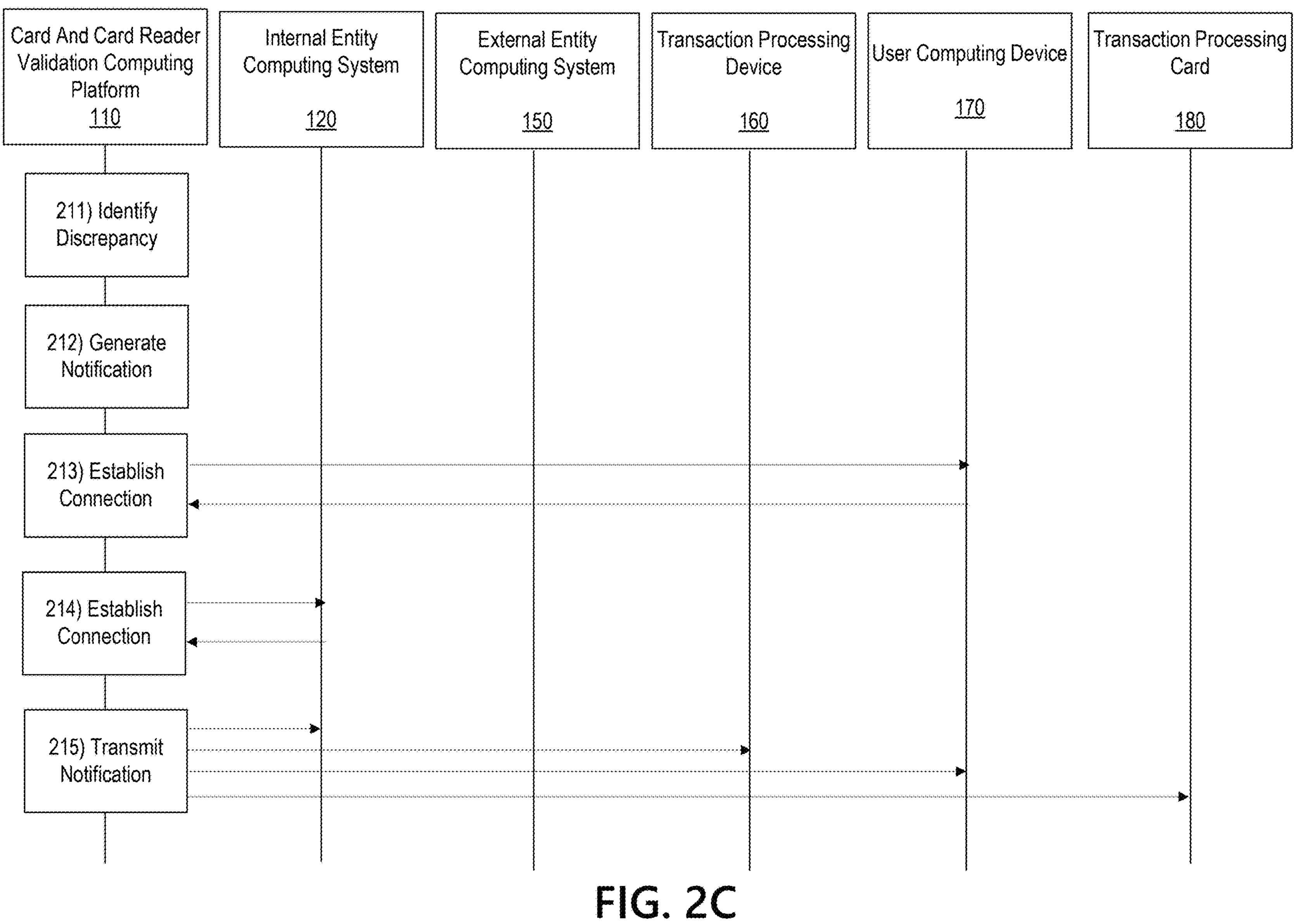
Figure 2D:
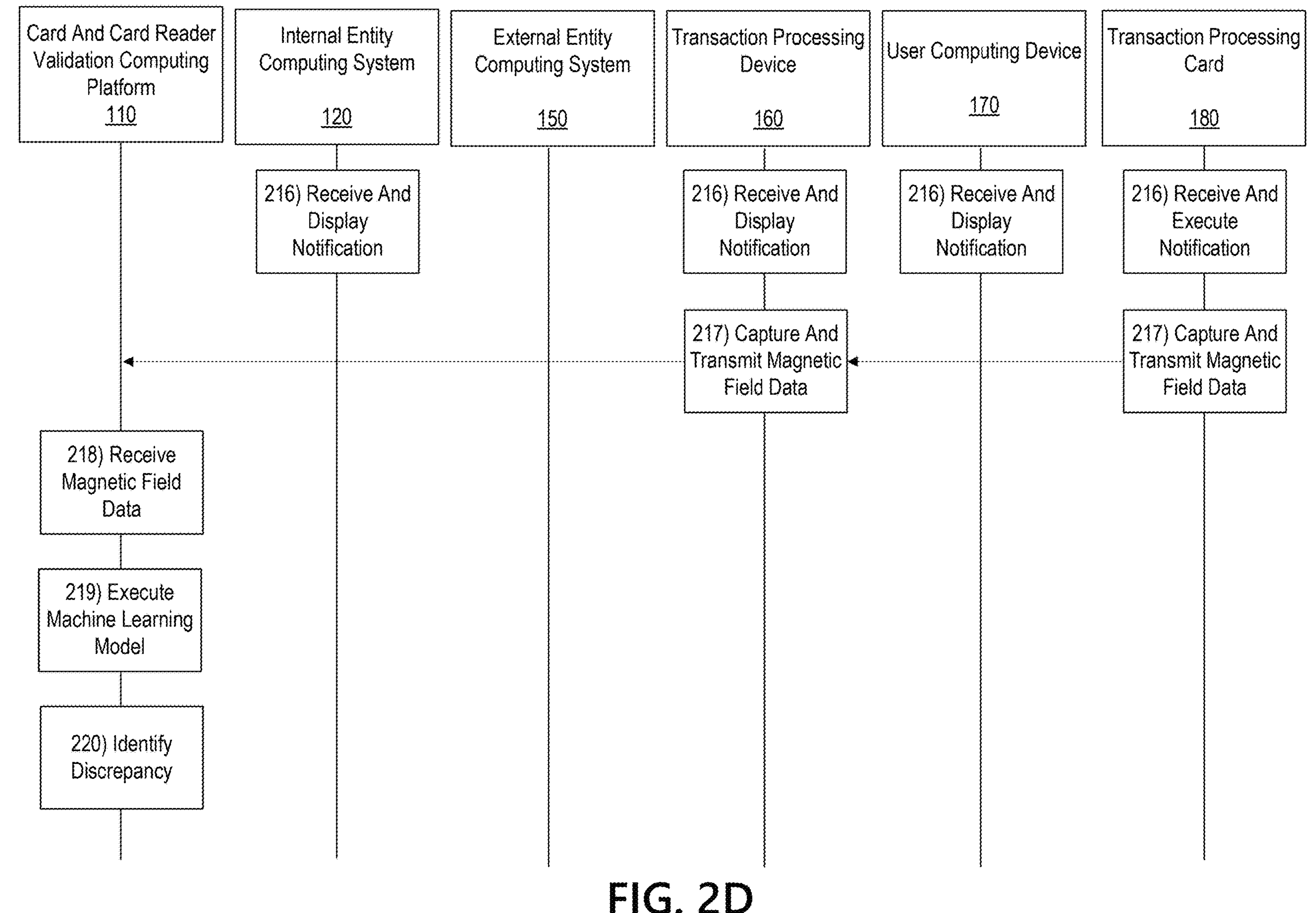
Figure 2E:
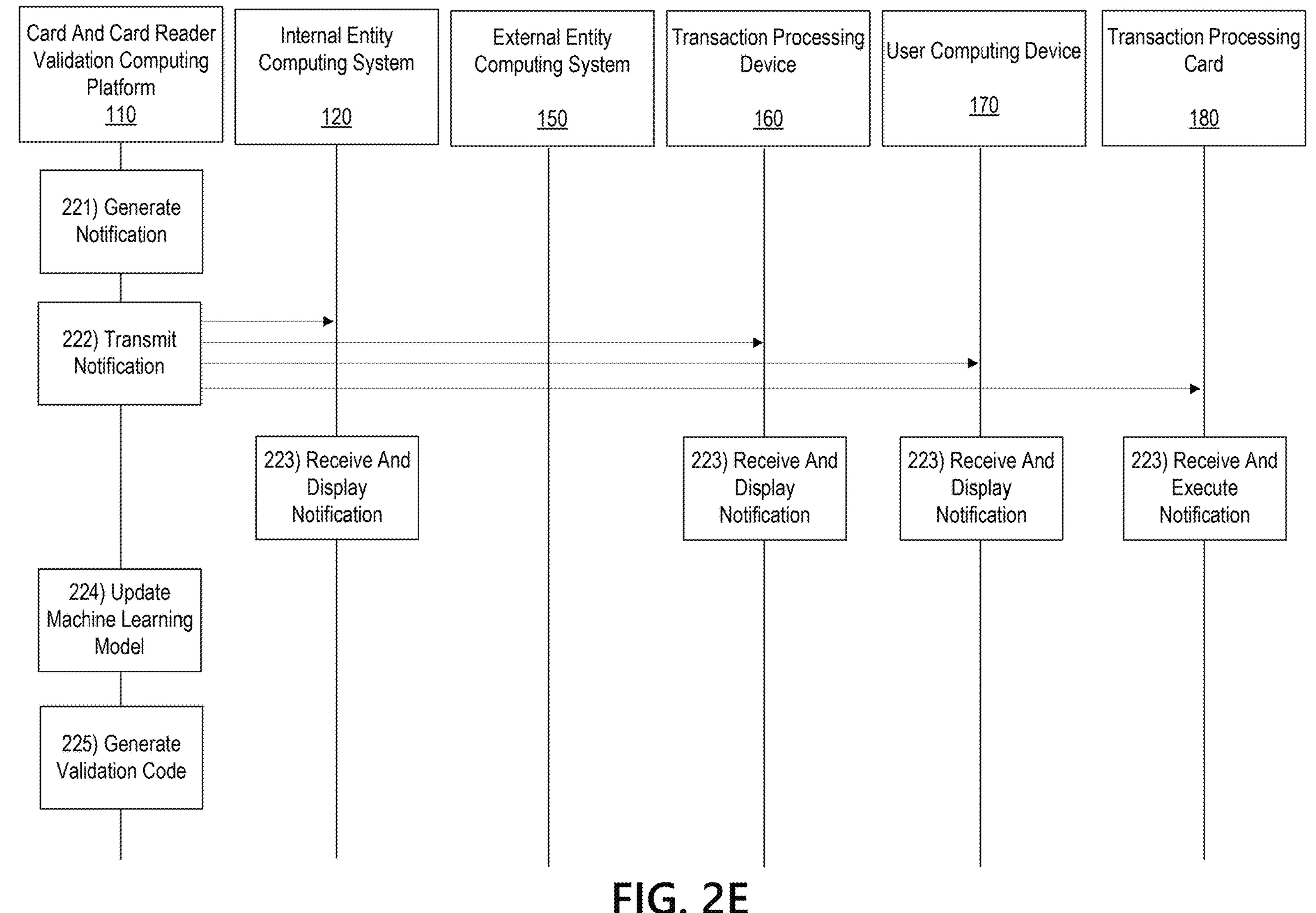
Figure 2F:
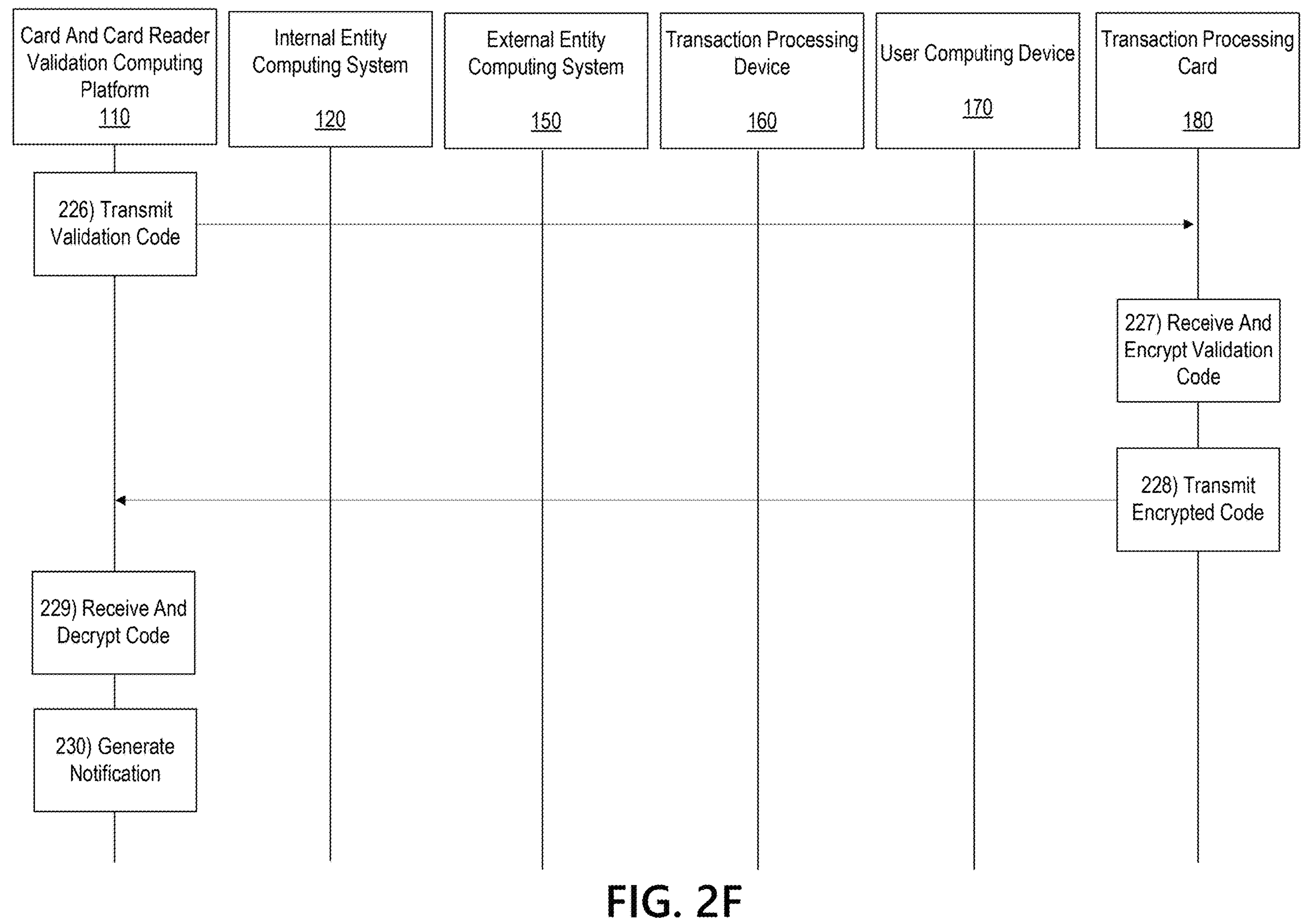
Figure 2G:
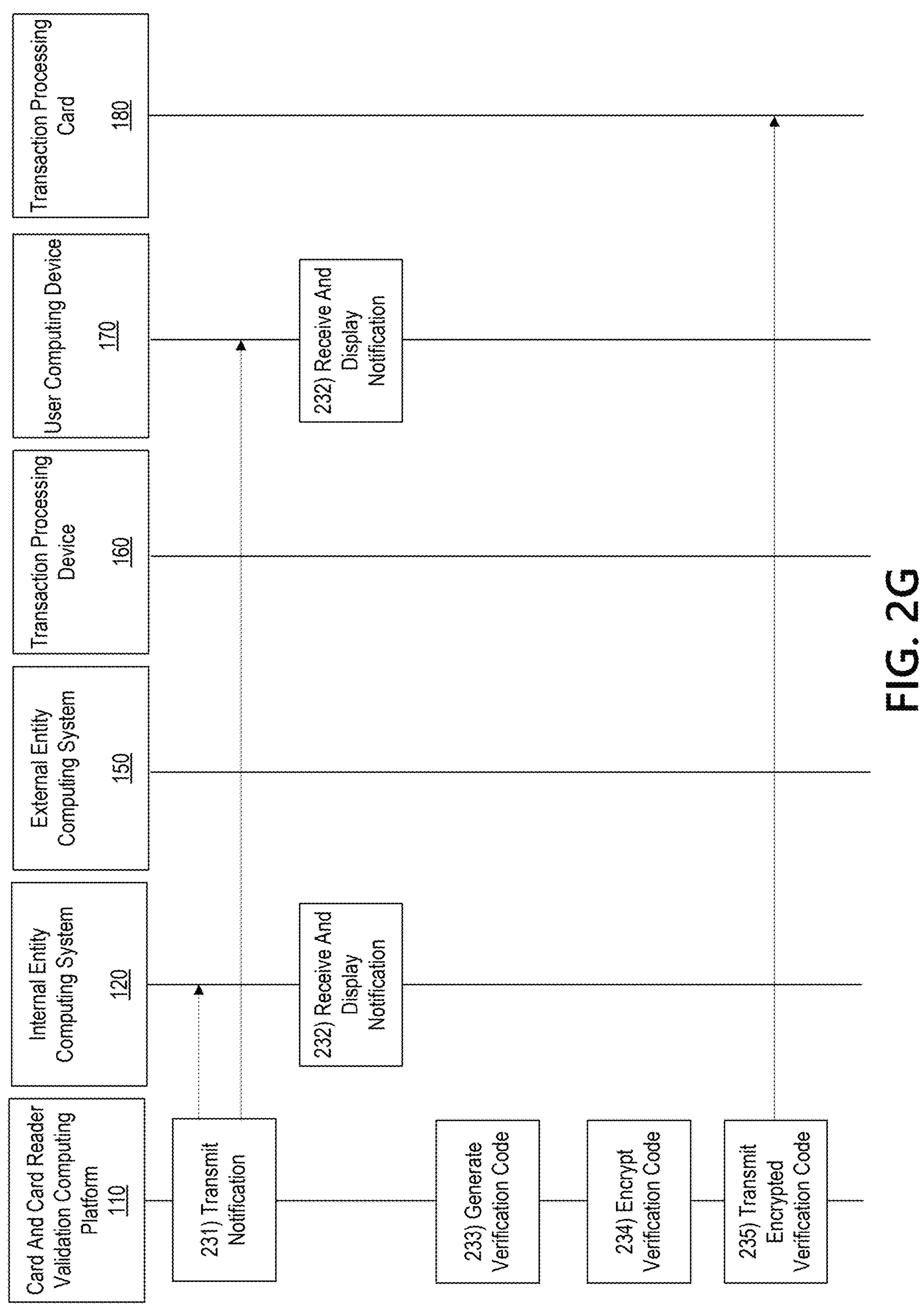
Figure 2H:
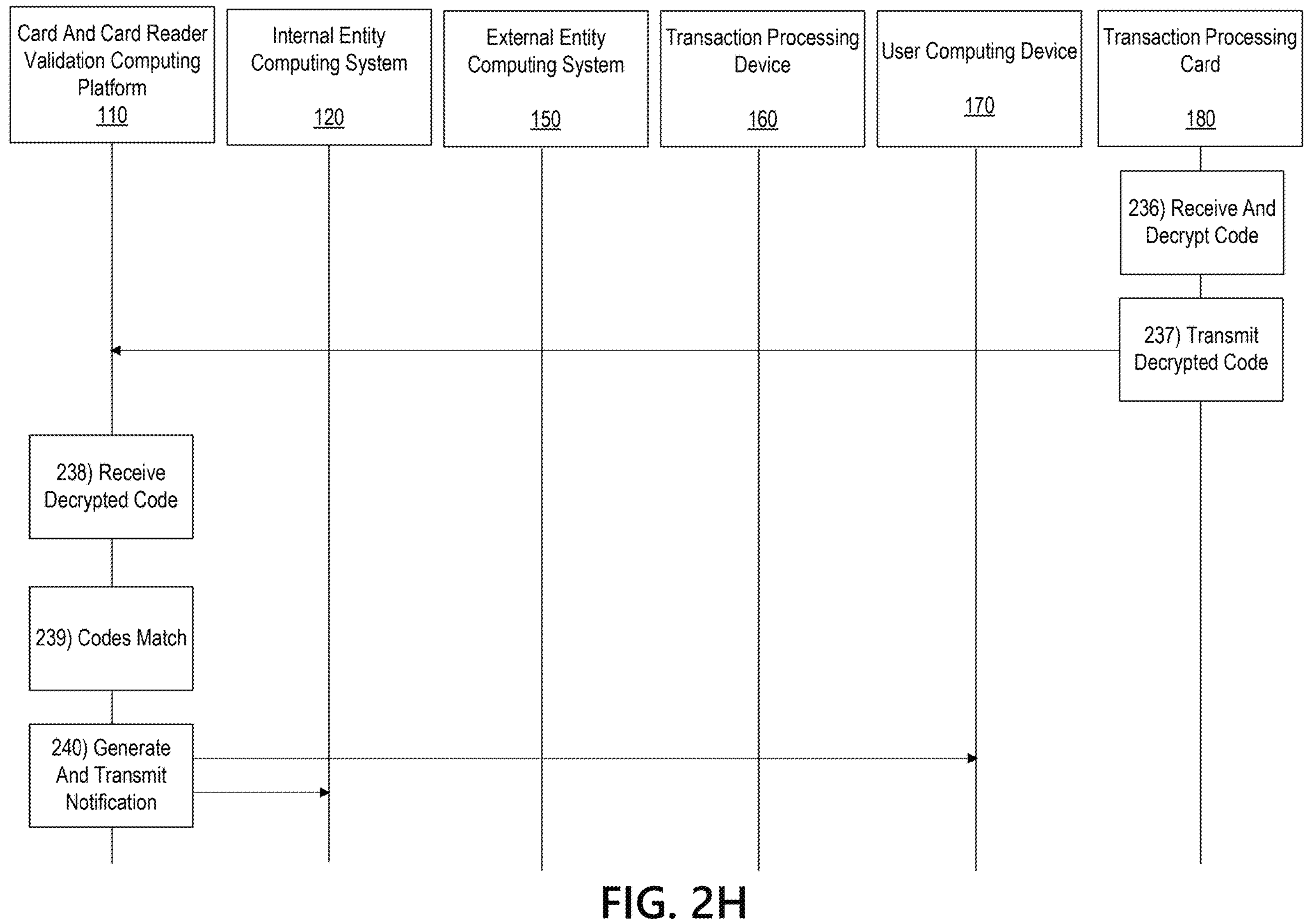
Figure 2I:
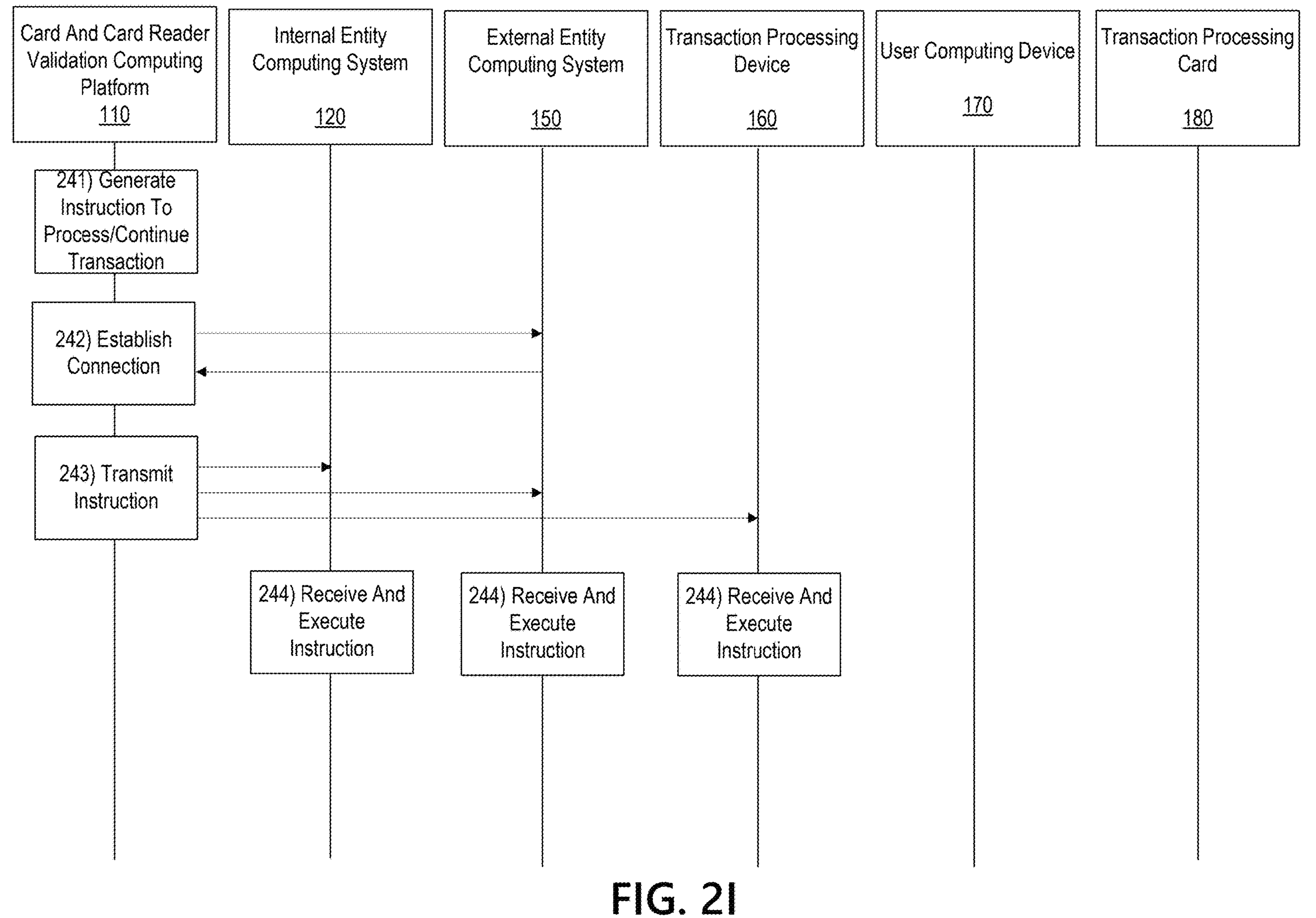

If, upon execution of the model at step 210, no discrepancies are detected, the process may proceed to step 217 in FIG. 2D to, in some examples, evaluate the magnetic field data, or to step 224 in FIG. 2E to update the machine learning model, or to step 241 in FIG. 2I to process the transaction.

With reference to FIG. 2C, at step 211, a discrepancy may be output by the machine learning model. For instance, analysis of the current capacitance data may indicate that the capacitance data does not match expected or baseline data (or is not within an expected threshold of the expected or baseline data). The discrepancy between the current capacitance data and the expected or baseline data may indicate a presence of a skimming device at the card reader 162 of the transaction processing device 160.

Figure 8:
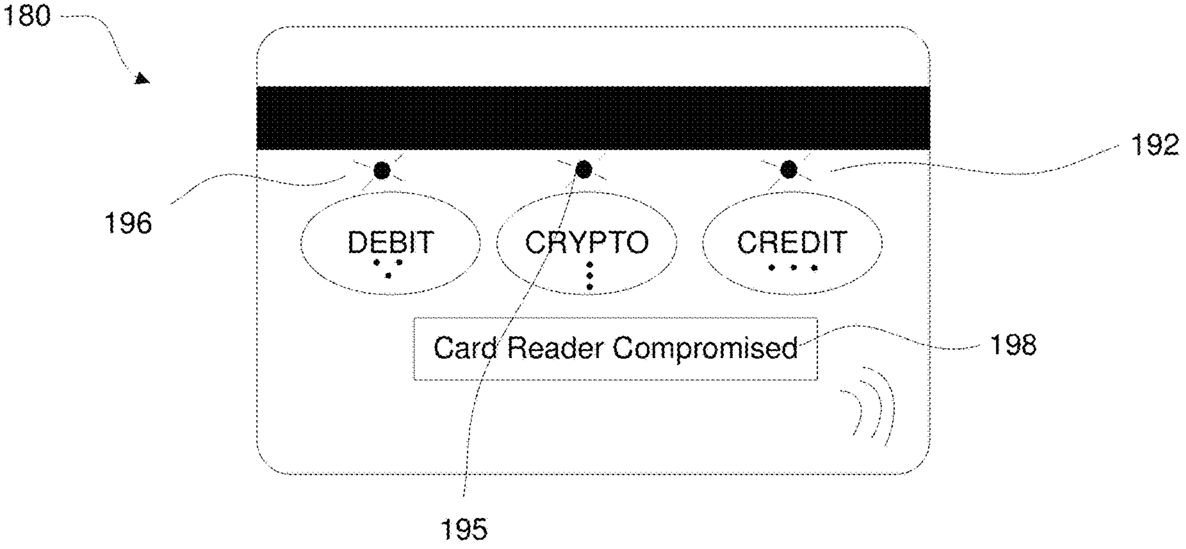
FIG. 8 illustrates one example transaction processing card executing generated notifications and instructions in accordance with one or more aspects described herein.

At step 212, based on the identified discrepancy, a notification may be generated. In some examples, the notification may include an indication that the card reader 162 at transaction processing device 160 is compromised. For instance, FIG. 6 illustrates one example notification 600 that may identify the card reader 162 as compromised. In some examples, the notification may include an instruction or command causing the notification to be displayed by a computing device or causing an indication to execute on a transaction processing card 180. For instance, the notification may include an instruction causing one or more LEDs on a transaction processing card 180 to automatically illuminate, flash, or the like when the instruction is received by the transaction processing card 180 and executed (e.g., by the microprocessor). For instance, transmission of the notification may cause, as shown in FIG. 8, one or more LED indicators 192, 195, 196 on transaction processing card 180 to illuminate, flash, illuminate in a particular color, or the like. In some examples, display screen or region may display a message indicating that the card reader is compromised. In some examples, the notification may cause the transaction processing card 180 to vibrate to indicate a potential issue.

In some examples, the notification may include an instruction or command that may cause the transaction processing device 160 to be disabled, deactivated, powered off, or the like, until the device may be investigated and any skimming devices removed. For instance, a notification transmitted to, for instance, internal entity computing system 120 may include an instruction or command that, when executed, may automatically cause the internal entity computing system 120 to disable, deactivate, or the like, transaction processing device 160. FIG. 7 illustrates one example notification 700 indicating that a card reader is compromised, that the transaction processing device 160 is disabled and instructing a user to investigate the compromised card reader 162.

At step 213, card and card reader validation computing platform 110 may establish a connection with user computing device 170. For instance, a third wireless connection may be established between card and card reader validation computing platform 110 and user computing device 170. Upon establishing the third wireless connection, a communication session may be initiated between card and card reader validation computing platform 110 and user computing device 170.

At step 214, card and card reader validation computing platform 110 may establish a connection with internal entity computing system 120. For instance, a fourth wireless connection may be established between card and card reader validation computing platform 110 and internal entity computing system 120. Upon establishing the fourth wireless connection, a communication session may be initiated between card and card reader validation computing platform 110 and internal entity computing system.

At step 215, the card and card reader validation computing platform 110 may transmit or send the generated notification to one or more of internal entity computing system 120, transaction processing device 160, user computing device 170 and/or transaction processing card 180. In some examples, transmitting or sending the notification may cause the notification to execute an instruction and/or display on a display of a respective computing device. In some examples, transmitting or sending the notification to internal entity computing system 120 may cause the internal entity computing system 120 to execute an instruction to disable, deactivate or power off the transaction processing device 160 until the device may be investigated for skimming devices. For instance, as shown in FIG. 7, notification 700 may include an indication that the card reader 162 is compromised and may indicate that an investigation should be performed. In some examples, the notification 700 may include an instruction that may be automatically executed by the internal entity computing system 120 that may cause the transaction processing device 160 associated with the compromised card reader 162 to be disabled, deactivated or the like.

With reference to FIG. 2D, at step 216, the notification may be received and displayed by one or more of internal entity computing system 120, transaction processing device 160 and/or user computing device 170. The notification may also be received and executed by transaction processing card 180 (e.g., instruction may execute to illuminate LEDs, vibrate, or the like).

In some aspects, a transaction processing device 160 and card reader may be evaluated to determine whether it is compromised based on a presence of a shimming device. At step 217, transaction processing device 160 and/or transaction processing card 180 may capture and transmit magnetic field data. For instance, one or more sensors in a transaction processing card 180 (while the transaction processing card is inserted into the card reader 162) and/or card reader 162 at transaction processing device 160 may capture magnetic field data (e.g., while a transaction processing card 180 is inserted into the card reader) in conjunction with the transaction initiated at step 205. The magnetic field data may be captured and transmitted in real-time. In some examples, the data may be transmitted by the transaction processing device 160 to the card and card reader validation computing platform 110. Additionally or alternatively, the data may be captured by the transaction processing card 180 and transmitted to the transaction processing device 160 for transmission to the card and card reader validation computing platform 110, or directly to the card and card reader validation computing platform 110.

At step 218, the card and card reader validation computing platform 110 may receive the magnetic field data.

At step 219, the card and card reader validation computing platform 110 may execute the machine learning model. For instance, the received current magnetic field data may be input to the machine learning model and the model may be executed to output any discrepancies between the current magnetic field data and expected or baseline data. In some examples, the baseline or expected data may be particular to the transaction processing device 160 and associated card reader 162.

If, upon execution of the model at step 219, no discrepancies are detected, the process may proceed to step 224 in FIG. 2E to update the machine learning model, or to step 241 in FIG. 2I to process the transaction.

At step 220, a discrepancy may be output by the machine learning model. For instance, analysis of the current magnetic field data may indicate that the magnetic field data does not match expected or baseline data (or is not within an expected threshold of the expected or baseline data).

The discrepancy between the current magnetic field data and the expected or baseline data may indicate a presence of a shimming device at the transaction processing device 160. The shimming device may include metallic parts that may alter the magnetic field captured or measured.

With reference to FIG. 2E, at step 221, based on the identified discrepancy, a notification may be generated. In some examples, the notification may include an indication that the card reader at transaction processing device 160 is compromised. For instance, FIG. 6 illustrates one example notification 600 that may identify the card reader 162 as compromised. In some examples, the notification may include an instruction or command causing the notification to be displayed by a computing device or causing an indication to execute on a transaction processing card 180. For instance, the notification may include an instruction causing one or more LEDs on a transaction processing card 180 to illuminate, flash, or the like when the instruction is received by the transaction processing card 180 and executed (e.g., by the microprocessor). For instance, transmission of the notification may cause, as shown in FIG. 8, one or more LED indicators 192, 195, 196 on transaction processing card 180 to illuminate, flash, illuminate in a particular color, or the like. In some examples, display screen or region may display a message indicating that the card reader is compromised. In some examples, the notification may cause the transaction processing card 180 to vibrate to indicate a potential issue.

In some examples, the notification may include an instruction or command that may cause the transaction processing device 160 to be disabled, deactivated, powered off, or the like, until the device may be investigated and any skimming devices removed. For instance, a notification transmitted to, for instance, internal entity computing system 120 may include an instruction or command that, when executed, may automatically cause the internal entity computing system 120 to disable, deactivate, or the like, transaction processing device 160. FIG. 7 illustrates one example notification 700 indicating that a card reader is compromised, that the transaction processing device 160 is disabled and instructing a user to investigate the compromised card reader 162.

At step 222, the card and card reader validation computing platform 110 may transmit or send the generated notification to one or more of internal entity computing system 120, transaction processing device 160, user computing device 170 and/or transaction processing card 180. In some examples, transmitting or sending the notification may cause the notification to execute an instruction and/or display on a display of a respective computing device.

At step 223, the notification may be received and displayed by one or more of internal entity computing system 120, transaction processing device 160 and/or user computing device 170. The notification may also be received and executed by transaction processing card 180 (e.g., instruction may execute to illuminate LEDs, vibrate, or the like). In some examples, transmitting or sending the notification to internal entity computing system 120 may cause the internal entity computing system 120 to execute an instruction to disable, deactivate or power off the transaction processing device 160 until the device may be investigated for skimming devices.

At step 224, card and card reader validation computing platform 110 may update and/or validate the machine learning model. For instance, based on detected discrepancies, notifications generated, additional analyzed data, and the like, the machine learning model may be updated via a dynamic feedback loop. Accordingly, the machine learning model may be continuously or near-continuously updated to improve accuracy in outputting or identifying discrepancies in capacitance and/or magnetic field data.

In some instances, card and card reader validation computing platform 110 may continuously update, validate, refine, or the like, the machine learning model. In some examples, the card and card reader validation computing platform 110 may maintain an accuracy threshold for the machine learning model and may pause refinement (through the dynamic feedback loop) of the model if the corresponding accuracy is identified as greater than the accuracy threshold. Further, if the accuracy is at or below the accuracy threshold, the card and card reader validation computing platform 110 may resume refinement of the model through the corresponding dynamic feedback loop.

Additional aspects may be directed to evaluating validity of a transaction processing card and/or card reader via two-way communication. At step 225, card and card reader validation computing platform 110 may generate a validation code. In some examples, the validation code may be dynamically generated in real-time based on initiation of the transaction at step 205. The validation code may include at least a time stamp associated with the transaction, a unique identifier associated with the card reader 162 at the transaction processing device 160 and geo-location data of the transaction processing device 160 at which the transaction is occurring.

With reference to FIG. 2F, at step 226, card and card reader validation computing platform 110 may transmit or send the generated validation code to the transaction processing card 180.

At step 227, the transaction processing card 180 may receive and encrypt (e.g. via microprocessor 183 and using an encryption key unique to or associated with the transaction processing card 180), the validation code. At step 228, the transaction processing card 180 may transmit or send the encrypted validation code to the card and card reader validation computing platform 110.

At step 229, the card and card reader validation computing platform 110 may receive the encrypted validation code and may attempt to decrypt the code using a decryption key associated with or unique to the transaction processing device 160 at which the transaction is occurring. If the decryption is not successful, the card may be deemed invalid and a notification may be generated at step 230. The notification may indicate that the card is invalid.

With reference to FIG. 2G, at step 231, card and card reader validation computing platform 110 may transmit or send the notification to internal entity computing system 120 and/or user computing device 170. In some examples, sending the notification may cause the notification to be displayed by a display of a respective computing device. In some examples, transmitting the notification to, for instance, internal entity computing system 120, may cause internal entity computing system 120 to deactivate or disable the transaction processing card 180.

At step 232, internal entity computing system 120 and/or user computing device may receive and display the notification, may execute one or more instructions or the like.

If, at step 229, the decryption is valid, the process may proceed to either step 233 to evaluate the validity of the card reader or transaction processing device 160, or may proceed to step 241 in FIG. 2I to process or proceed with the transaction.

At step 233, card and card reader validation computing platform 110 may generate a verification code to evaluate the validity of the transaction processing device 160 and card reader associated therewith. The verification code may be dynamically generated.

At step 234, the card and card reader validation computing platform 110 may encrypt the verification code. In some examples, the verification code may be encrypted using a key unique to or associated with the transaction processing device 160 or card reader 162 associated therewith.

At step 235, the card and card reader validation computing platform 110 may transmit or send the encrypted verification code to the transaction processing card 180 (e.g., the card inserted into the card reader 162 slot at transaction processing device 160).

With reference to FIG. 2H, at step 236, the transaction processing card 180 may receive and decrypt the verification code using a decryption key unique to or associated with the transaction processing card 180.

At step 237, the transaction processing card 180 may transmit or send the decrypted verification code to the card and card reader validation computing platform 110.

At step 238, the card and card reader validation computing platform 110 may receive the decrypted verification code and may compare it to the verification code generated at step 234.

At step 239, the system may determine whether the decrypted code matches the generated code. If so, the transaction processing device 160 and card reader are validated and the process may proceed to step 241 in FIG. 2I to process or proceed with the transaction.

If the codes do not match, a notification indicating that the card reader 162 and/or transaction processing device 160 may be compromised may be generated at step 240. The generated notification may be transmitted to one or more of the internal entity computing system 120 and/or user computing device 170 and may be displayed by a display of the respective computing device. In some examples, transmitting the notification to the internal entity computing system 120 may cause the internal entity computing system 120 to execute an instruction to disable, deactivate, power off, or the like, the potentially compromised transaction processing device 160. In some examples, the notification may be similar to notification 700 shown in FIG. 7.

With reference to FIG. 2I, at step 241, card and card reader validation computing platform 110 may generate an instruction to process the transaction or enable a user to proceed with the transaction (e.g., make additional selections related to the transaction, or the like).

At step 242, card and card reader validation computing platform 110 may establish a connection with external entity computing system 150. For instance, a fifth wireless connection may be established between card and card reader validation computing platform 110 and external entity computing system 150. Upon establishing the fifth wireless connection, a communication session may be initiated between card and card reader validation computing platform 110 and external entity computing system 150.

At step 243, card and card reader validation computing platform 110 may transmit or send the generated instruction to one or more of internal entity computing system 120, external entity computing system 150 and/or transaction processing device 160. For instance, if the transaction is an ATM transaction, the instruction may be transmitted to internal entity computing system 120 that may provide back end support for the ATM and to transaction processing device 160 (e.g., the ATM) to enable the user to continue with the transaction. If the transaction is, for instance, a purchase, the instruction may be transmitted to external entity computing system 150 which may be a transaction processing entity, for further processing.

At step 244, the instruction may be received and executed by one or more of internal entity computing system 120, external entity computing system 150 and/or transaction processing device 160.

Figure 3:
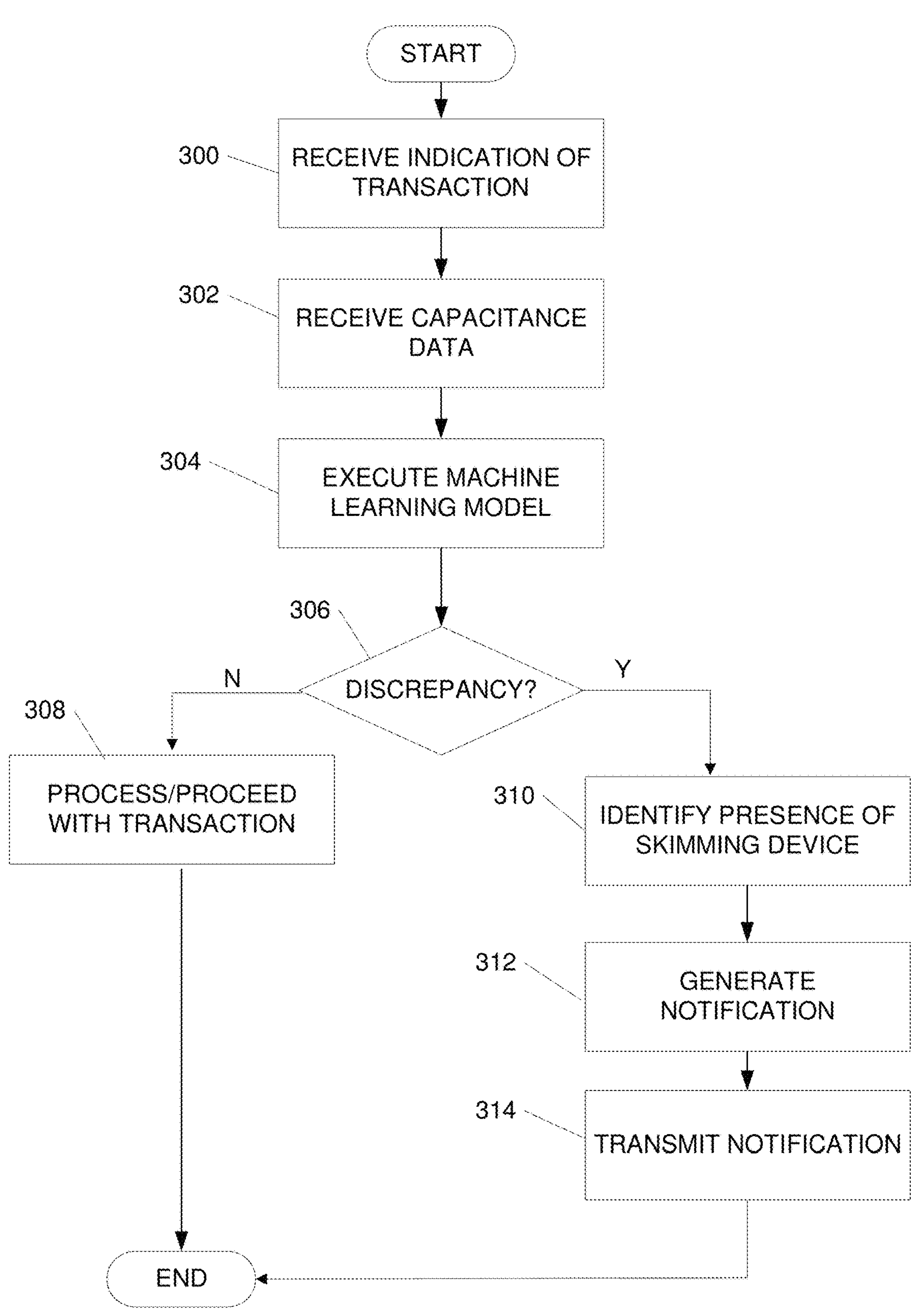
FIG. 3 illustrates an illustrative method for implementing unauthorized activity detection according to one or more aspects described herein.

FIG. 3 is a flow chart illustrating one example method of unauthorized activity detection in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, card and card reader validation computing platform 110 may receive an indication that a transaction has been initiated at a transaction processing device 160. In some examples, the transaction may be initiated via an interaction between a transaction processing card 180 and a card reader 162 of transaction processing device 160 (e.g., the card 180 is inserted into a card reader 162 slot, card 180 is swiped through a card reader 162, or the like).

At step 302, card and card reader validation computing platform 110 may receive capacitance data. For instance, the capacitance data may be captured or measured by one or more sensors on the transaction processing card 180, card reader 162, or the like. The capacitance data may be captured when a transaction processing card 180 is slid through, inserted into, or the like, a card reader 162, to initiate, request, enable or the like the transaction processing device 160 to capture data from the transaction processing card 180. The capacitance data may be received in real-time.

At step 304, the card and card reader validation computing platform 110 may execute the machine learning model. For instance, the received capacitance data may be input to the machine learning model and the model may be executed to determine whether a discrepancy exists between expected or baseline capacitance data and the current capacitance data.

At step 306, a determination may be made as to whether a discrepancy was detected. If not, at step 308, the user may continue with a transaction as desired (e.g., purchase transaction, ATM transaction, or the like).

If, at step 306, a discrepancy is detected, at step 310, a presence of a skimming device may be identified for the card reader 162 associated with the received capacitance data. In some examples, detecting a discrepancy in the capacitance data may also cause the transaction that was initiated to be cancelled (e.g., to avoid unauthorized access to user data via the skimming device).

At step 312, card and card reader validation computing platform 110 may generate a notification indicating that the skimming device has been detected. In some examples, the notification may include instructions that may cause transaction processing card 180 to illuminate or flash one or more LEDs, vibrate, or the like. In some examples, the notification may include an instruction causing a computing device associated with an enterprise organization to disable or deactivate the transaction processing device 160.

At step 314, the notification may be transmitted to, for instance, the transaction processing card 180. For example, the notification may be transmitted to the transaction processing card 180 which may cause one or more LEDs to illuminate on the card, cause the card 180 to vibrate, or the like to indicate a skimmer is present. In some arrangements, the notification may be transmitted to an enterprise computing device which may cause the enterprise computing device to disable, deactivate or power off the impacted transaction processing device 160. Additionally or alternatively, the notification may be transmitted to a mobile or other computing device of the user, such as user device 170.

Figure 4:
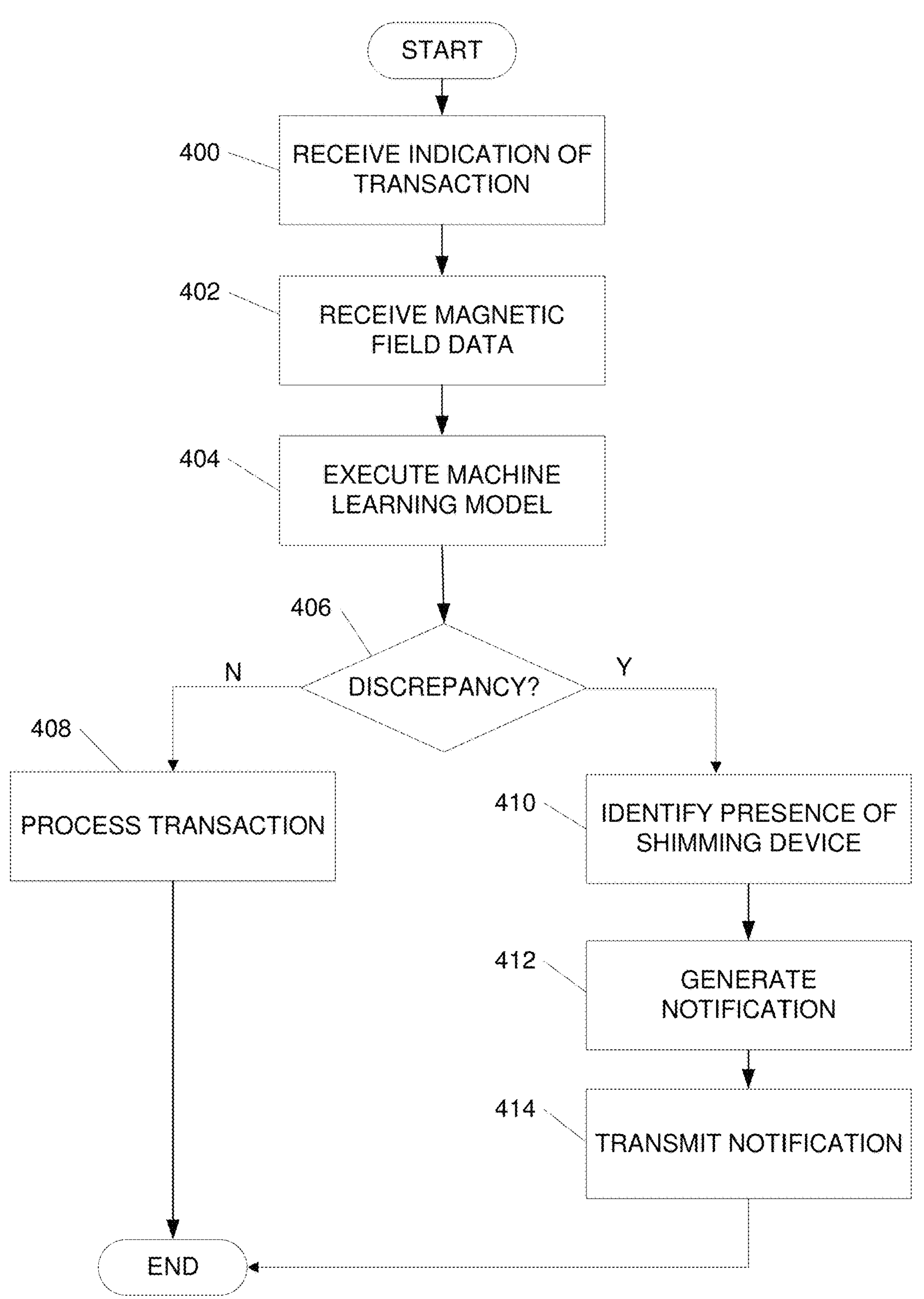
FIG. 4 illustrates another illustrative method for implementing unauthorized activity detection in accordance with one or more aspects described herein.

FIG. 4 is a flow chart illustrating another example method of unauthorized activity detection in accordance with one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 4 may be performed in real-time or near real-time.

At step 400, card and card reader validation computing platform 110 may receive an indication that a transaction has been initiated at a transaction processing device 160. In some examples, the transaction may be initiated via an interaction between a transaction processing card 180 and a card reader 162 of transaction processing device 160 (e.g., the card 180 is inserted into a card reader 162 slot, card 180 is swiped through a card reader 162, or the like).

At step 402, card and card reader validation computing platform 110 may receive magnetic field data. The magnetic field data may be captured when a transaction processing card 180 is inserted into a card reader 162, to initiate, request, enable or the like the transaction processing device 160 to capture data from the transaction processing card 180. The magnetic field data may be received in real-time. In some examples, the magnetic field data may be received from one or more sensors in the transaction processing card 180, card reader 162, or the like.

At step 404, the card and card reader validation computing platform 110 may execute the machine learning model. For instance, the received magnetic field data may be input to the machine learning model and the model may be executed to determine whether a discrepancy exists between expected or baseline magnetic field data and the current magnetic field data.

At step 406, a determination may be made as to whether a discrepancy was detected. If not, at step 408, the user may continue with a transaction as desired (e.g., purchase transaction, ATM transaction, or the like).

If, at step 406, a discrepancy is detected, at step 410, a presence of a shimming device may be identified for the card reader 162 from which the magnetic field data was received. In some examples, detecting a discrepancy in the magnetic field data may also cause the transaction that was initiated to be cancelled (e.g., to avoid unauthorized access to user data via the shimming device).

At step 412, card and card reader validation computing platform 110 may generate a notification indicating that the shimming device has been detected. In some examples, the notification may include instructions that may cause transaction processing card 180 to illuminate or flash one or more LEDs, vibrate, or the like. In some examples, the notification may include an instruction causing a computing device associated with an enterprise organization to disable or deactivate the transaction processing device 160.

At step 414, the notification may be transmitted to, for instance, the transaction processing card 180. For example, the notification may be transmitted to the transaction processing card 180 which may cause one or more LEDs to illuminate on the card, cause the card 180 to vibrate, or the like to indicate a shimmer is present. In some arrangements, the notification may be transmitted to an enterprise computing device which may cause the enterprise computing device to disable, deactivate or power off the impacted transaction processing device 160. Additionally or alternatively, the notification may be transmitted to a mobile or other computing device of the user, such as user device 170.

Figure 5:
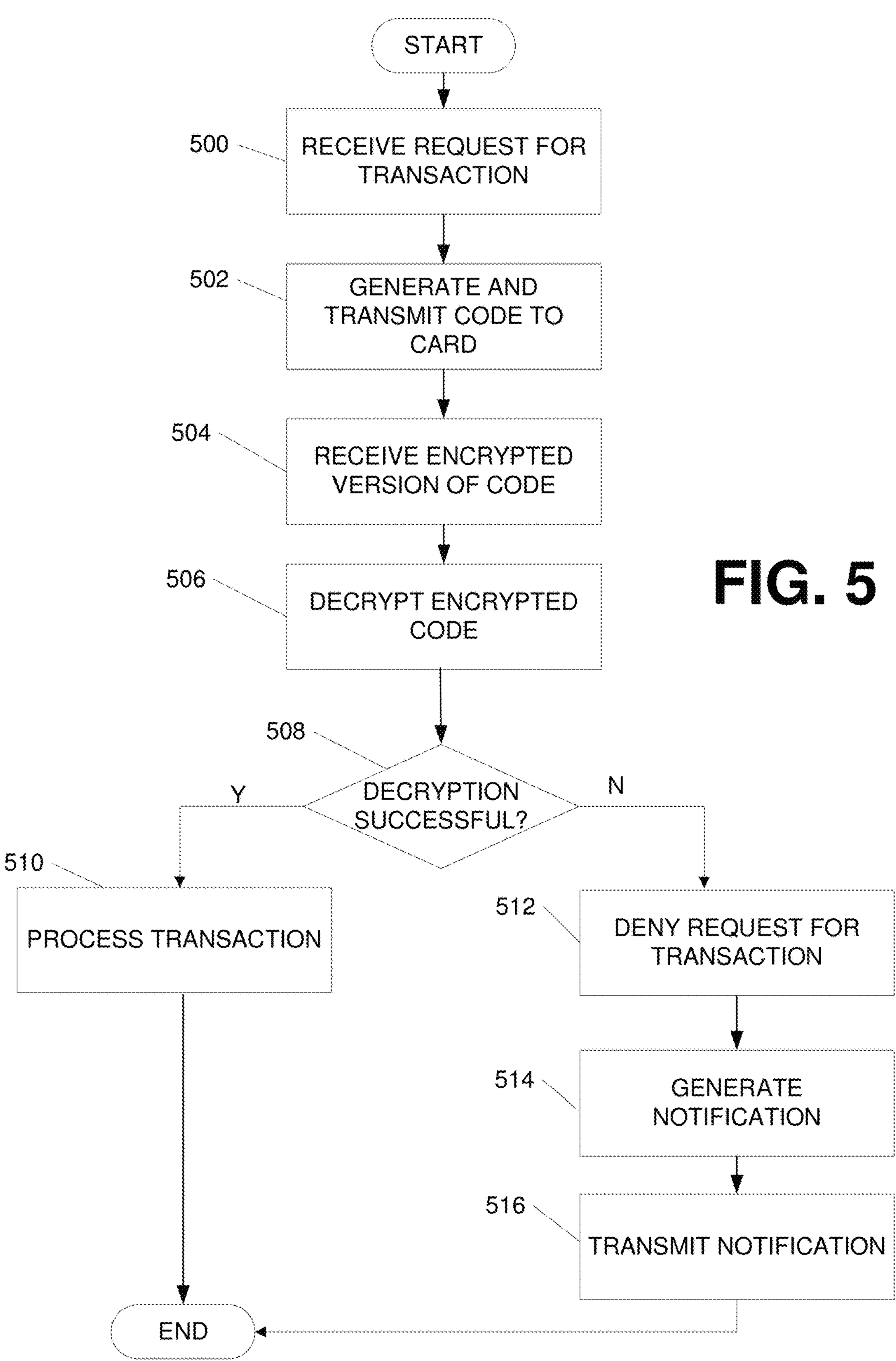
FIG. 5 illustrates yet another illustrative method for implementing unauthorized activity detection in accordance with one or more aspects described herein.

FIG. 5 is a flow chart illustrating yet another example method of unauthorized activity detection in accordance with one or more aspects described herein. The processes illustrated in FIG. 5 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 5 may be performed in real-time or near real-time.

At step 500, a request for a transaction may be received by the card and card reader validation computing platform 110. The request for the transaction may be received from a transaction processing card 180 via a card reader 162 of a transaction processing device 160. In some examples, the request for transaction may be based on a user inserting the transaction processing card 180 into the card reader 162 of the transaction processing device 160.

At step 502, card and card reader validation computing platform 110 may dynamically generate and transmit a validation code may be transmitted to the transaction processing card 180. In some examples, the validation code may include at least a time stamp associated with the requested transaction, geo-location data of the transaction processing device 160 and a unique identifier associated with the card reader 162.

At step 504, card and card reader validation computing platform 110 may receive an encrypted version of the dynamically generated validation code from the transaction processing card 180. In some examples, the encrypted version may be encrypted using a private encryption key associated with the transaction processing card 180.

At step 506, the card and card reader validation computing platform 110 may decrypt the encrypted dynamically generated validation code. The decryption may be performed using a public key associated with the transaction processing device 160. In some examples, the public key may be associated with the card reader 162 of the transaction processing device 160.

At step 508, card and card reader validation computing platform 110 may determine whether the decryption was successful. If so, the requested transaction may be processed at step 510.

If the decryption was not successful, at step 512, the request for transaction may be denied. At step 514, a notification indicating that the transaction processing card 180 is not valid may be generated and transmitted to one or more computing devices. For instance, the notification may be sent to user device 170 associated with a verified or registered user of the transaction processing card 180. Additionally or alternatively, the notification may be transmitted to an enterprise organization computing device to disable the transaction processing card 180.

In some examples, responsive to determining that the decryption was successful and prior to processing the request for transaction, the card and card reader validation computing platform 110 may generate a verification code. The card and card reader validation computing platform 110 may encrypt the verification code using, for instance, a private key associated with the transaction processing device 160. The encrypted verification code may be transmitted to the transaction processing card 180. The transaction processing card 180 may decrypt the encrypted verification code using a public key associated with the transaction processing card 180 and the decrypted verification code may be received by the card and card reader validation computing platform 110. The decrypted code may be compared to the generated code to determine whether they match. If so, the transaction may be processed. If not, a notification indicating the card reader is compromised may be generated and transmitted to, for instance, an enterprise organization computing device. In some examples, the notification may include an instruction causing the enterprise organization computing device to disable, deactivate, or the like, the transaction processing device 160.

As discussed herein, aspects described provide improved security by efficiently detecting potentially compromised card readers at a transaction processing device, such as an ATM, POS, or the like. For instance, the arrangements described herein provide efficient detection of a skimming device (e.g., an unauthorized device attached to a card reader to capture data from a magnetic strip of a transaction processing card), a shimming device (e.g., an unauthorized device attached to a card reader to capture chip data from a transaction processing card), and confirmation of validity of a transaction processing card and card reader based on two-way communication between the transaction processing card and card reader. Accordingly, the arrangements described herein may reduce or eliminate the likelihood of user data being compromised by identifying issues and informing the user, administrator, or the like.

As discussed herein, smart, integrated mini sensors may be used to capture capacitance data, magnetic field data, and the like, at a card reader and machine learning may be used to evaluate the data to identify any discrepancies. Because aspects described herein can detect both skimming and shimming devices, even in arrangements where a user attempts a chip transaction but is unsuccessful and has to use the magnetic strip data to process the transaction, an unauthorized device attempting to access the data will be detected (e.g., the shimming device may be detected to prevent data being captured from the chip while the skimming device may be detected to prevent data being captured from the magnetic strip).

Further, in addition to evaluation based on the sensor data, or in lieu of evaluation based on sensor data, the card and card reader may still be validated (e.g., even in transaction processing devices or cards without the necessary sensors) using two-way communication (e.g., near-field communication) between a card and card reader to validate both the card and card reader, as described herein. For instance, as discussed herein, a card may be validated by receive a validation code from the card reader/transaction processing device (and/or card and card reader validation computing platform) and the card may encrypt the code using an internal encryption key. The card may send the encrypted code to the card reader/transaction processing device/card and card reader validation computing platform where the code may be decrypted using a key associated with the card reader/transaction processing device. If decryption is successful, the card may be validated.

To validate the card reader, the card reader (e.g., via transaction processing device/card and card reader validation computing platform) may generate a verification code and may encrypt the code using a public key. The encrypted code may be sent to the transaction processing card and decrypted using a private key. The decrypted code may be sent back to the card reader (e.g., transaction processing device/card and card reader validation computing platform) and if the decrypted code matches the generated code the card reader may be validated. If not, the card reader may be considered compromised.

In some examples, the codes may be dynamically generated to ensure additional security by changing codes from transaction to transaction.

As discussed herein, data may be captured by one or more sensors embedded on the transaction processing card 180, within card reader 162, or the like. Accordingly, historical data from a plurality of transactions may be captured and used to train the machine learning model. Further, current data may be received and analyzed in real-time to quickly identify a compromised card reader 162 in order to mitigate impact to a user or customer.

Figure 9:
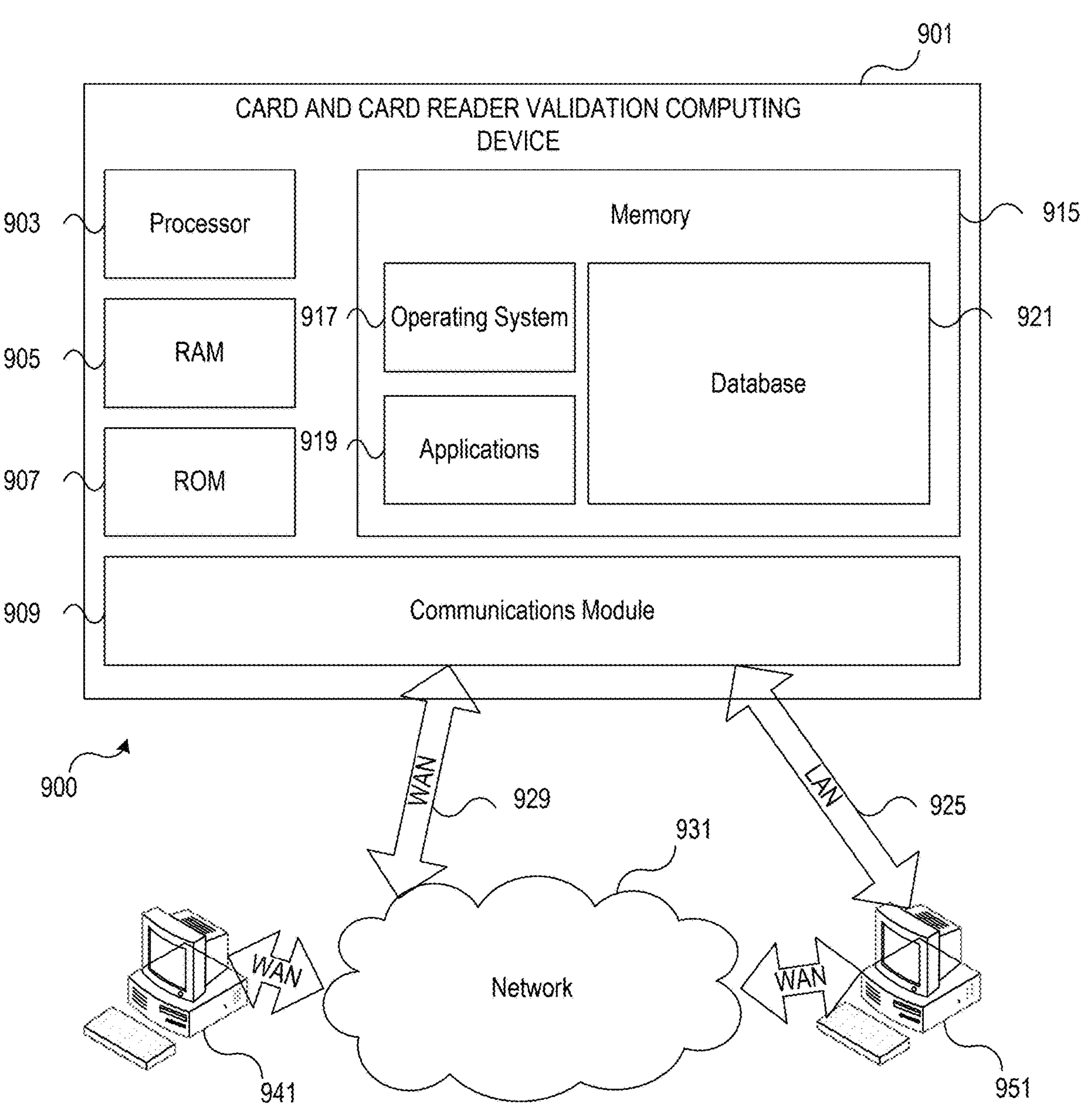
FIG. 9 illustrates one example environment in which various aspects of the disclosure may be implemented in accordance with one or more aspects described herein.

FIG. 9 depicts an illustrative operating environment in which various aspects of the present disclosure may be implemented in accordance with one or more example embodiments. Referring to FIG. 9, computing system environment 900 may be used according to one or more illustrative embodiments. Computing system environment 900 is only one example of a suitable computing environment and is not intended to suggest any limitation as to the scope of use or functionality contained in the disclosure. Computing system environment 900 should not be interpreted as having any dependency or requirement relating to any one or combination of components shown in illustrative computing system environment 900.

Computing system environment 900 may include card and card reader validation computing device 901 having processor 903 for controlling overall operation of card and card reader validation computing device 901 and its associated components, including Random Access Memory (RAM) 905, Read-Only Memory (ROM) 907, communications module 909, and memory 915. Card and card reader validation computing device 901 may include a variety of computer readable media. Computer readable media may be any available media that may be accessed by card and card reader validation computing device 901, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by card and card reader validation computing device 901.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on card and card reader validation computing device 901. Such a processor may execute computer-executable instructions stored on a computer-readable medium.

Software may be stored within memory 915 and/or storage to provide instructions to processor 903 for enabling card and card reader validation computing device 901 to perform various functions as discussed herein. For example, memory 915 may store software used by card and card reader validation computing device 901, such as operating system 917, application programs 919, and associated database 921. Also, some or all of the computer executable instructions for card and card reader validation computing device 901 may be embodied in hardware or firmware. Although not shown, RAM 905 may include one or more applications representing the application data stored in RAM 905 while card and card reader validation computing device 901 is on and corresponding software applications (e.g., software tasks) are running on card and card reader validation computing device 901.

Communications module 909 may include a microphone, keypad, touch screen, and/or stylus through which a user of card and card reader validation computing device 901 may provide input, and may also include one or more of a speaker for providing audio output and a video display device for providing textual, audiovisual and/or graphical output. Computing system environment 900 may also include optical scanners (not shown).

Card and card reader validation computing device 901 may operate in a networked environment supporting connections to one or more remote computing devices, such as computing devices 941 and 951. Computing devices 941 and 951 may be personal computing devices or servers that include any or all of the elements described above relative to card and card reader validation computing device 901.

The network connections depicted in FIG. 9 may include Local Area Network (LAN) 925 and Wide Area Network (WAN) 929, as well as other networks. When used in a LAN networking environment, card and card reader validation computing device 901 may be connected to LAN 925 through a network interface or adapter in communications module 909. When used in a WAN networking environment, card and card reader validation computing device 901 may include a modem in communications module 909 or other means for establishing communications over WAN 929, such as network 931 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:

at least one processor;

a communication interface communicatively coupled to the at least one processor; and a memory storing computer-readable instructions that, when executed by the at least one processor, cause the computing platform to:

receive an indication that a transaction has been initiated at a transaction processing device, wherein the transaction is initiated via an interaction between a transaction processing card and a card reader of the transaction processing device;

receive, from one or more sensors in the transaction processing card, capacitance data associated with a capacitance measured when the transaction processing card is inserted into the card reader;

execute a machine learning model, wherein executing the machine learning model includes inputting the capacitance data to the machine learning model to output identification of any discrepancies in the capacitance data;

based on detecting, via the machine learning model, a discrepancy in the capacitance data, determine that a skimming device is present in the card reader of the transaction processing device;

generate a notification indicating that the skimming device is present in the card reader of the transaction processing device; and transmit, to the transaction processing card, the generated notification, wherein transmitting the generated notification to the transaction processing card causes a light emitting diode on the transaction processing card to illuminate.

2. The computing platform of claim 1, further including instructions that, when executed cause the computing platform to:

transmit the generated notification to a computing device of an enterprise organization associated with the transaction processing device.

3. The computing platform of claim 2, wherein transmitting the generated notification to the computing device of the enterprise organization associated with the transaction processing device causes the computing device of the enterprise organization to disable or deactivate the transaction processing device.

4. The computing platform of claim 1, wherein transmitting, to the transaction processing card, the generated notification, further causes the transaction processing card to vibrate.

5. The computing platform of claim 1, wherein transmitting, to the transaction processing card, the generated notification further causes a light emitting diode on the transaction processing card to flash.

6. The computing platform of claim 1, further including instructions that, when executed, cause the computing platform to:

based on detecting, via the machine learning model, a discrepancy in the capacitance data, cancelling the transaction that has been initiated.

7. The computing platform of claim 1, further including instructions that, when executed cause the computing platform to:

transmit the generated notification to a user computing device.

8. The computing platform of claim 1, wherein the capacitance is measured based on a physical distance between the transaction processing card and the card reader.

9. The computing platform of claim 1, wherein the capacitance is measured by a sensor of the one or more sensors in the transaction processing card.

10. A method, comprising:

receiving, by a computing platform, the computing platform having at least one processor, and memory, an indication that a transaction has been initiated at a transaction processing device, wherein the transaction is initiated via an interaction between a transaction processing card and a card reader of the transaction processing device;

receiving, by the at least one processor and from one or more sensors in the transaction processing card, capacitance data associated with a capacitance measured when the transaction processing card is inserted into the card reader;

executing, by the at least one processor, a machine learning model, wherein executing the machine learning model includes inputting the capacitance data to the machine learning model to output identification of any discrepancies in the capacitance data;

based on detecting, by the at least one processor and via the machine learning model, a discrepancy in the capacitance data, determining, by the at least one processor, that a skimming device is present in the card reader of the transaction processing device;

generating, by the at least one processor, a notification indicating that the skimming device is present in the card reader of the transaction processing device; and transmitting, by the at least one processor and to the transaction processing card, the generated notification, wherein transmitting the generated notification to the transaction processing card causes a light emitting diode on the transaction processing card to illuminate.

11. The method of claim 10, further including:

transmitting, by the at least one processor, the generated notification to a computing device of an enterprise organization associated with the transaction processing device.

12. The method of claim 11, wherein transmitting the generated notification to the computing device of the enterprise organization associated with the transaction processing device causes the computing device of the enterprise organization to disable or deactivate the transaction processing device.

13. The method of claim 10, wherein transmitting, to the transaction processing card, the generated notification, further causes the transaction processing card to vibrate.

14. The method of claim 10, wherein transmitting, to the transaction processing card, the generated notification further causes a light emitting diode on the transaction processing card to flash.

15. The method of claim 10, further including:

based on detecting, by the at least one processor and via the machine learning model, a discrepancy in the capacitance data, cancelling the transaction that has been initiated.

16. One or more non-transitory computer-readable media storing instructions that, when executed by a computing platform comprising at least one processor, memory, and a communication interface, cause the computing platform to:

receive an indication that a transaction has been initiated at a transaction processing device, wherein the transaction is initiated via an interaction between a transaction processing card and a card reader of the transaction processing device;

receive, from one or more sensors in the transaction processing card, capacitance data associated with a capacitance measured when the transaction processing card is inserted into the card reader;

execute a machine learning model, wherein executing the machine learning model includes inputting the capacitance data to the machine learning model to output identification of any discrepancies in the capacitance data;

based on detecting, via the machine learning model, a discrepancy in the capacitance data, determine that a skimming device is present in the card reader of the transaction processing device;

generate a notification indicating that the skimming device is present in the card reader of the transaction processing device; and transmit, to the transaction processing card, the generated notification, wherein transmitting the generated notification to the transaction processing card causes a light emitting diode on the transaction processing card to illuminate.

17. The one or more non-transitory computer-readable media of claim 16, further including instructions that, when executed cause the computing platform to:

transmit the generated notification to a computing device of an enterprise organization associated with the transaction processing device.

18. The one or more non-transitory computer-readable media of claim 17, wherein transmitting the generated notification to the computing device of the enterprise organization associated with the transaction processing device causes the computing device of the enterprise organization to disable or deactivate the transaction processing device.

19. The one or more non-transitory computer-readable media of claim 16, wherein transmitting, to the transaction processing card, the generated notification, further causes the transaction processing card to vibrate.

20. The one or more non-transitory computer-readable media of claim 16, wherein transmitting, to the transaction processing card, the generated notification further causes a light emitting diode on the transaction processing card to flash.

* * * * *